(12) United States Patent
Matsuno

(10) Patent No.: US 10,770,741 B2
(45) Date of Patent: Sep. 8, 2020

(54) FUEL CELL MODULE WITH HYDRODESULFURIZER AND PREHEATING

(71) Applicants: TOSHIBA ENERGY SYSTEMS & SOLUTIONS CORPORATION, Kawasaki-shi (JP); KABUSHIKI KAISHA TOSHIBA, Minato-ku (JP)

(72) Inventor: Takeshi Matsuno, Yokohama (JP)

(73) Assignees: TOSHIBA ENERGY SYSTEMS & SOLUTIONS CORPORATION, Kawasaki-shi (JP); KABUSHIKI KAISHA TOSHIBA, Minato-ku (JP)

( * ) Notice: Subject to any disclaimer, the term of this patent is extended or adjusted under 35 U.S.C. 154(b) by 88 days.

(21) Appl. No.: 15/628,783

(22) Filed: Jun. 21, 2017

(65) Prior Publication Data
US 2018/0062191 A1 Mar. 1, 2018

(30) Foreign Application Priority Data

Aug. 31, 2016 (JP) .................................. 2016-169802
May 24, 2017 (JP) .................................. 2017-102843

(51) Int. Cl.
*H01M 8/0662* (2016.01)
*H01M 8/0612* (2016.01)
(Continued)

(52) U.S. Cl.
CPC ......... *H01M 8/0675* (2013.01); *H01M 8/002* (2013.01); *H01M 8/0202* (2013.01);
(Continued)

(58) Field of Classification Search
CPC ........... H01M 8/0675; H01M 8/04014; H01M 8/0618; H01M 8/002; H01M 8/0432; H01M 8/0202; H01M 2008/1293
See application file for complete search history.

(56) References Cited

U.S. PATENT DOCUMENTS

| 2005/0022449 A1* | 2/2005 | Katikaneni | ............ B01D 53/48 48/198.3 |
| 2009/0023045 A1* | 1/2009 | Ohmori | ................. H01M 8/006 429/444 |

(Continued)

FOREIGN PATENT DOCUMENTS

| EP | 2 840 016 A1 | 2/2015 |
| EP | 2 887 438 A1 | 6/2015 |

(Continued)

OTHER PUBLICATIONS

Extended European Search Report dated Aug. 17, 2017 in European Patent Application No. 17177242.9.

*Primary Examiner* — Maria Laios
*Assistant Examiner* — Kwang Han
(74) *Attorney, Agent, or Firm* — Oblon, McClelland, Maier & Neustadt, L.L.P.

(57) ABSTRACT

A fuel cell module according to the present embodiment includes a hydrodesulfurizer, a cell stack, an exhaust gas channel portion, and an air-preheating channel portion. The hydrodesulfurizer is configured to desulfurize fuel gas using a hydrodesulfurization catalyst. A reformer is configured to generate a hydrogen-containing gas. The cell stack is constituted by stacking a plurality of fuel cells and is configured to generate electric power. The exhaust gas channel portion is configured to discharge the hydrogen-containing gas, and discharge exhaust gas that is generated by the combustion of the oxygen-containing gas. The air-preheating channel portion is an air-preheating channel portion that is disposed so as to be adjacent to the exhaust gas channel portion and that is configured to preheat the oxygen-containing gas through heat exchange with the exhaust gas channel portion. The air-preheating channel portion is disposed between the hydrodesulfurizer and the cell stack.

11 Claims, 13 Drawing Sheets

(51) Int. Cl.
  *H01M 8/04014* (2016.01)
  *H01M 8/00* (2016.01)
  *H01M 8/0202* (2016.01)
  *H01M 8/0432* (2016.01)
  *H01M 8/124* (2016.01)

(52) U.S. Cl.
  CPC ..... *H01M 8/04014* (2013.01); *H01M 8/0432* (2013.01); *H01M 8/0618* (2013.01); *H01M 2008/1293* (2013.01)

(56) References Cited

U.S. PATENT DOCUMENTS

| | | | |
|---|---|---|---|
| 2010/0203399 A1* | 8/2010 | Poshusta | H01M 8/04089 429/408 |
| 2011/0223500 A1* | 9/2011 | Uematsu | H01M 8/04014 429/415 |
| 2013/0017458 A1* | 1/2013 | Umeda | H01M 8/04231 429/410 |
| 2015/0072253 A1 | 3/2015 | Yoshimura et al. | |
| 2015/0311553 A1 | 10/2015 | Dohkoshi et al. | |
| 2016/0149247 A1 | 5/2016 | Kita et al. | |
| 2016/0213862 A1 | 7/2016 | Whitaker et al. | |
| 2016/0329580 A1* | 11/2016 | Kakuwa | H01M 8/0618 |
| 2017/0012312 A1* | 1/2017 | Watanabe | H01M 8/0618 |

FOREIGN PATENT DOCUMENTS

| | | |
|---|---|---|
| EP | 3 026 744 A1 | 6/2016 |
| JP | 2011-159485 A | 8/2011 |
| JP | 2011-216308 A | 10/2011 |
| JP | 2014-107187 A | 6/2014 |
| JP | 2015-15094 A | 1/2015 |
| JP | 2016-95943 A | 5/2016 |
| KR | 10-2009-0118865 A1 | 11/2009 |

* cited by examiner

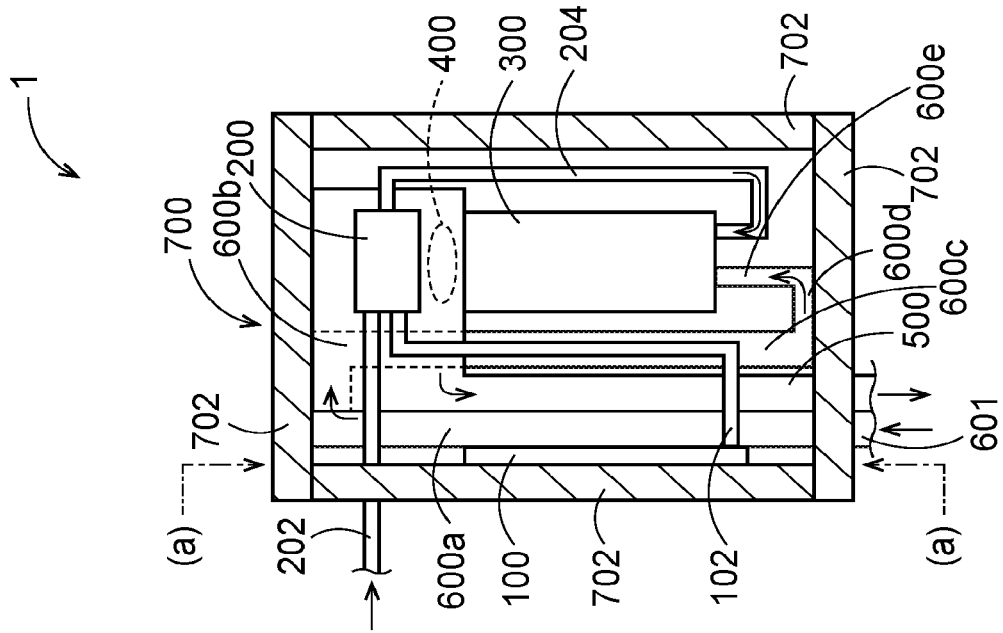
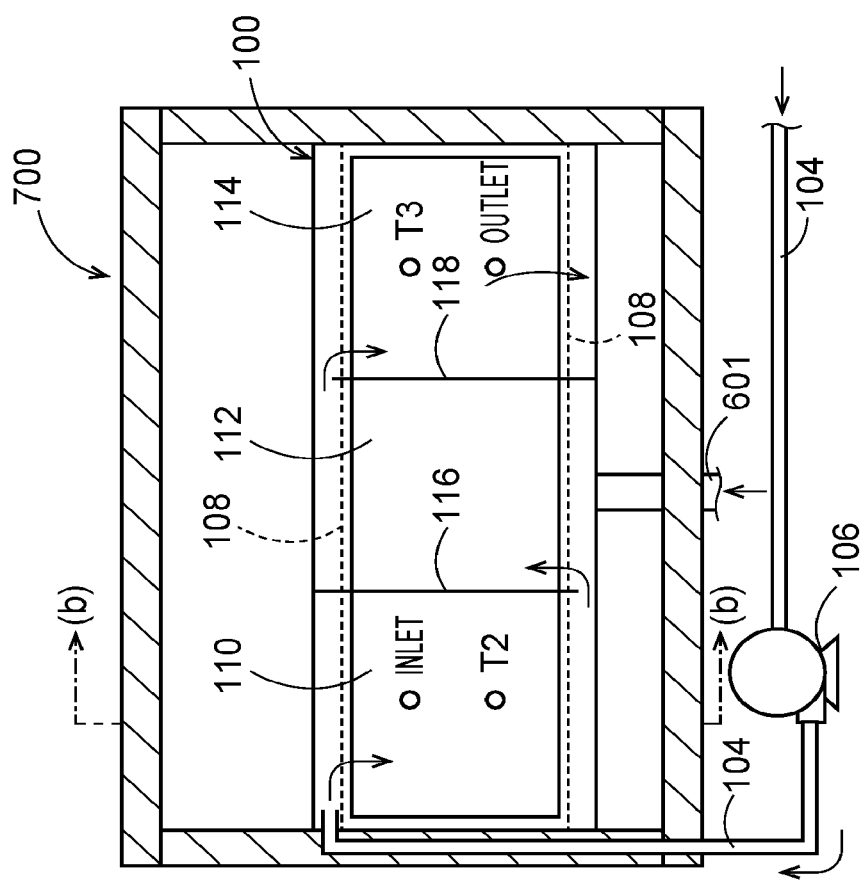
FIG.1A
FIG.1B

| TEMPERATURE [°C] | HM22 | HM25 | HM41a | HM41b | HM49 | HM50 | HM54 |
|---|---|---|---|---|---|---|---|
| INLET | 242 | 299 | 244 | 233 | 279 | 272 | 229 |
| T2 | 245 | 286 | 227 | 206 | 254 | 275 | 236 |
| T3 | 371 | 335 | 311 | 294 | 313 | 314 | 249 |
| OUTLET | 306 | 277 | 270 | 301 | 275 | 297 | 239 |
| MAXIMUM DIFFERENCE IN TEMPERATURE | 129 | 58 | 84 | 95 | 59 | 42 | 20 |
| MAXIMUM TEMPERATURE | 371 | 335 | 311 | 294 | 313 | 314 | 249 |

FIG.2

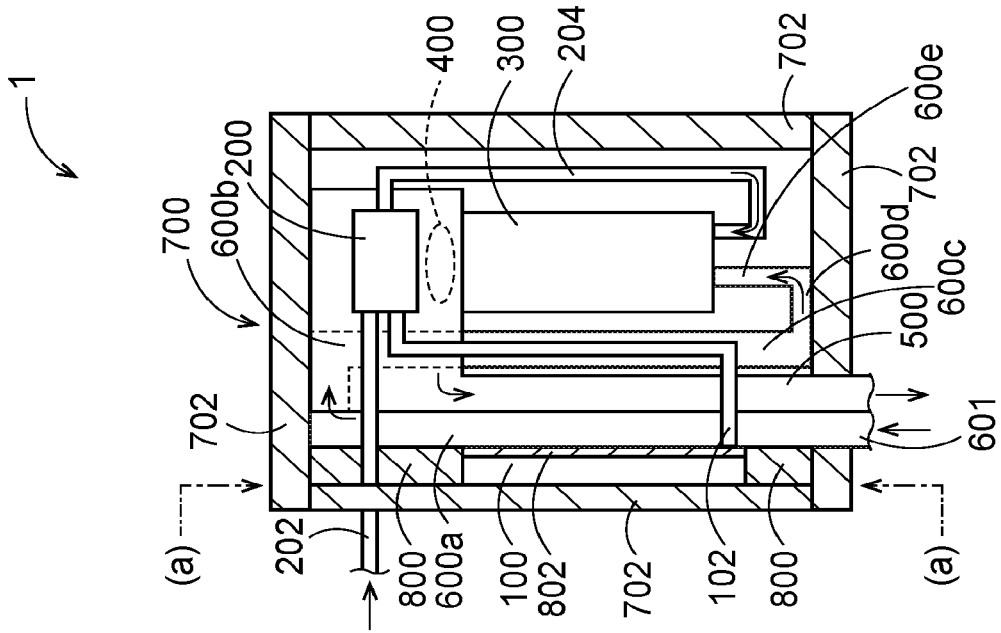
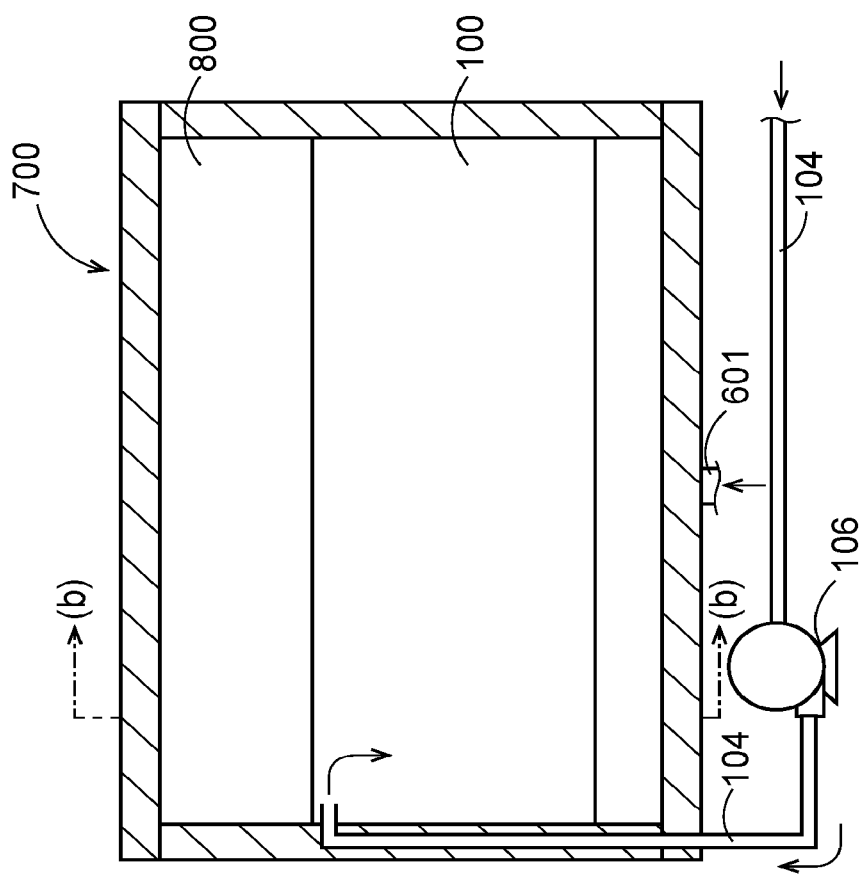
FIG.3B
FIG.3A

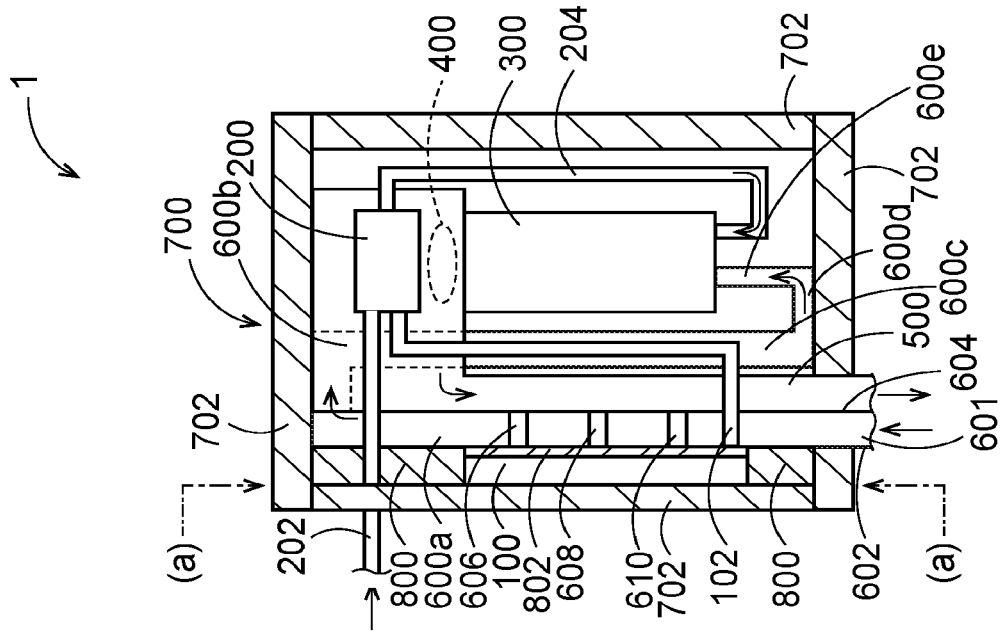
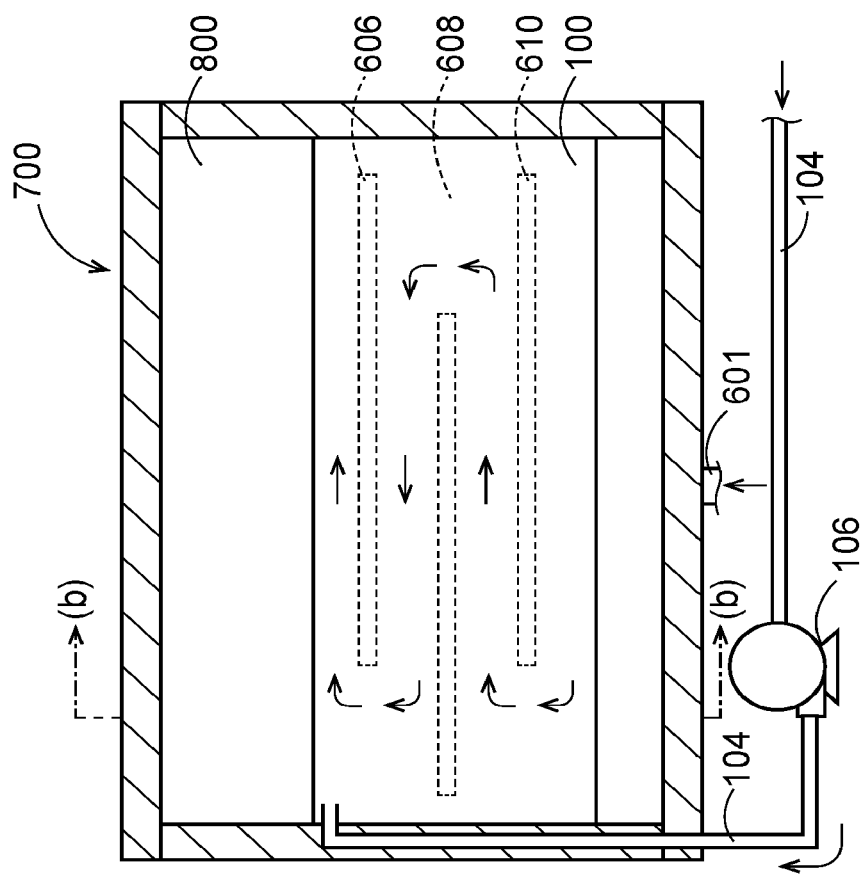
FIG.4B
FIG.4A

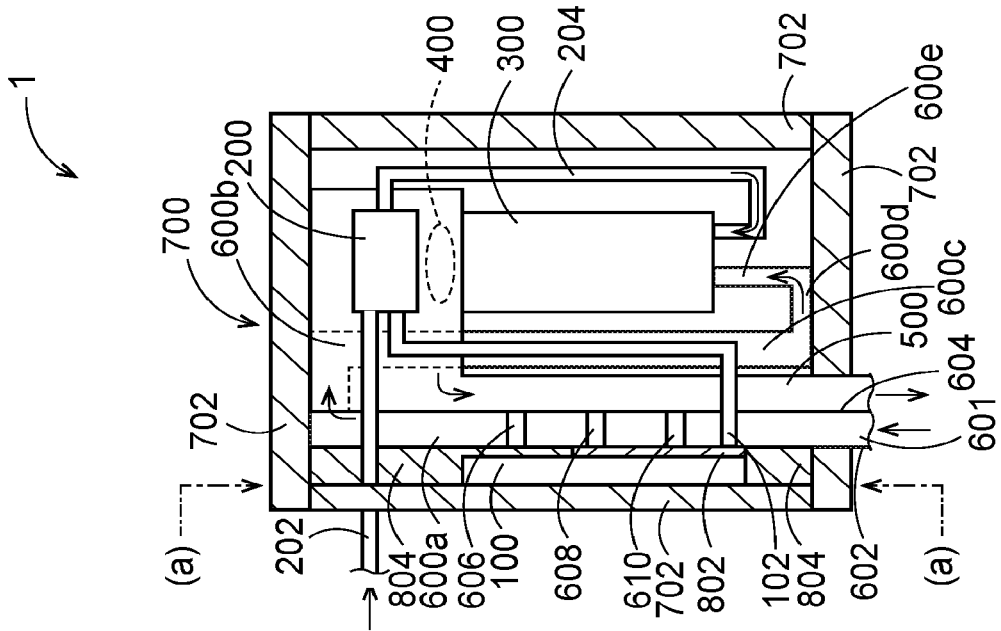
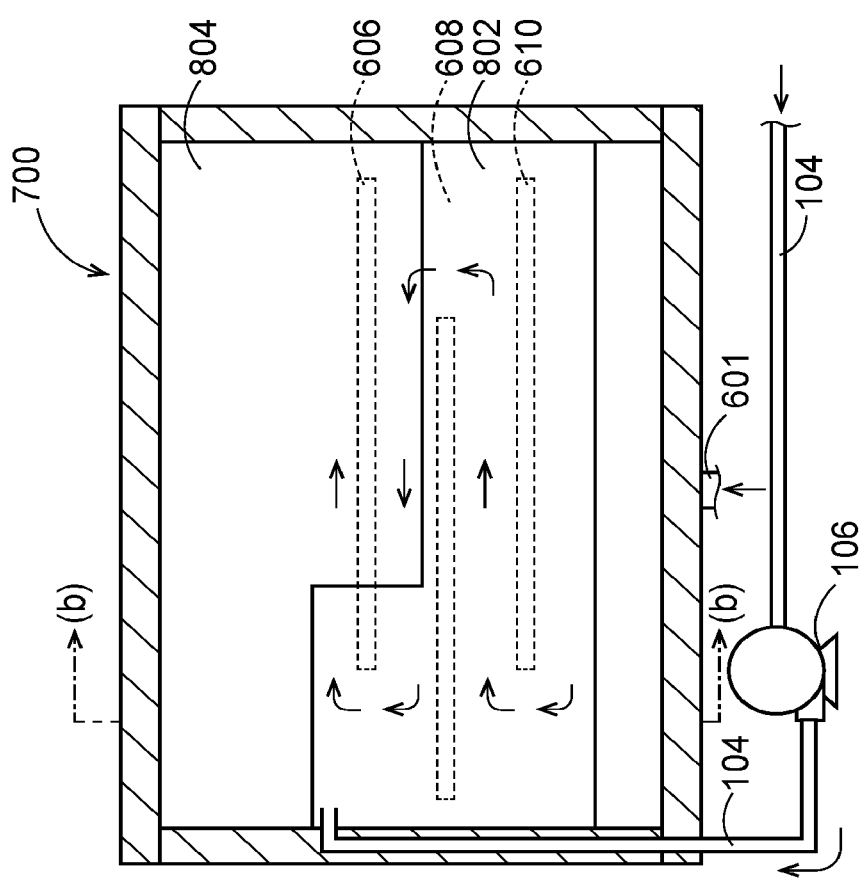
FIG.5B
FIG.5A

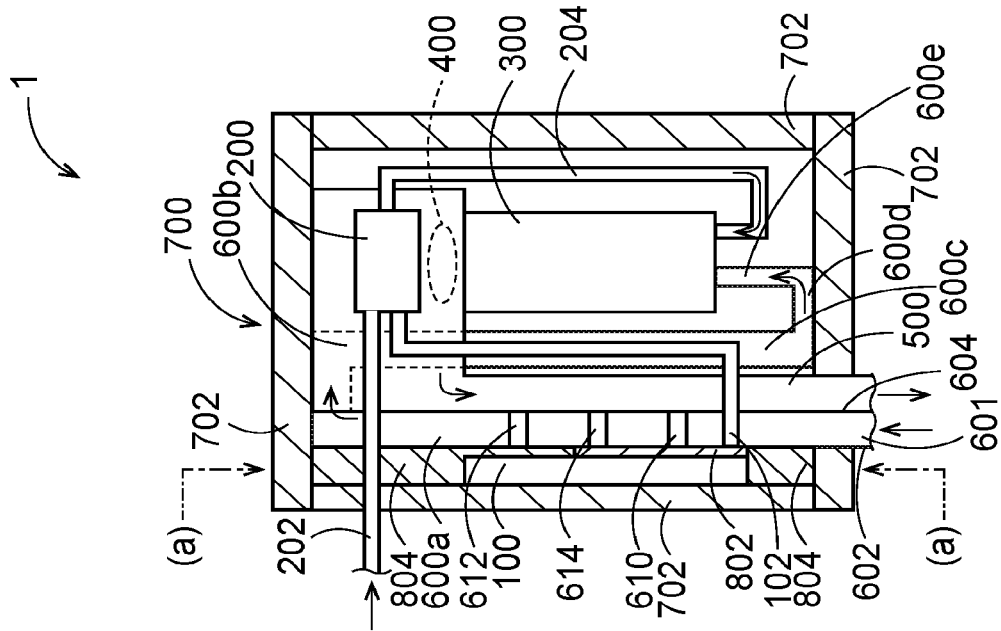
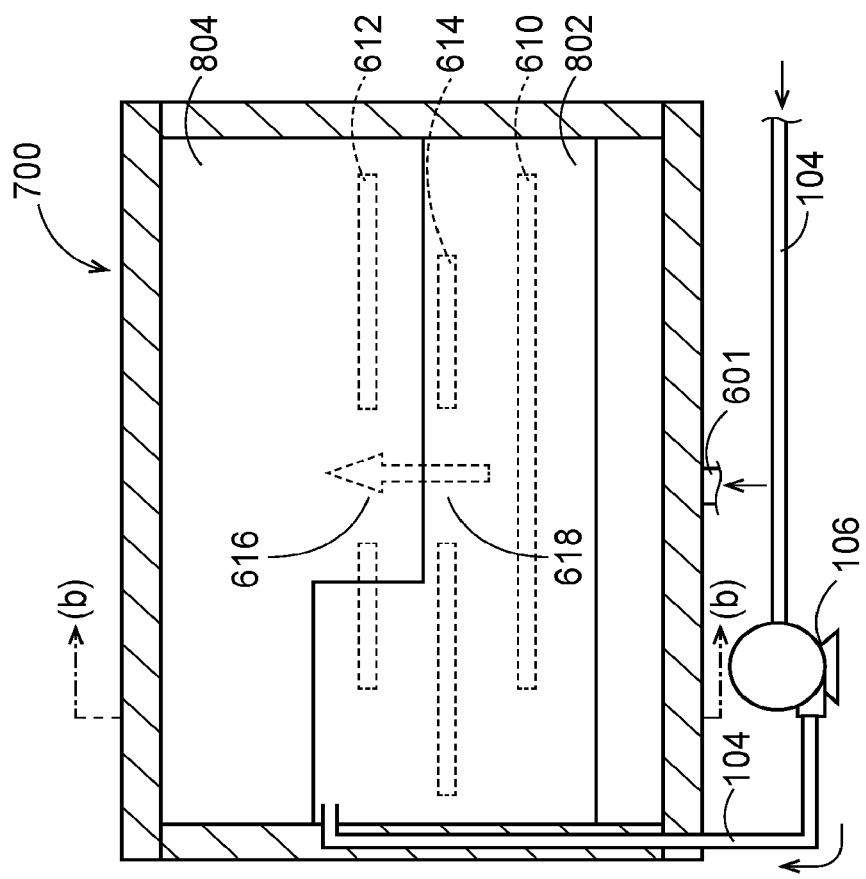
FIG.6B
FIG.6A

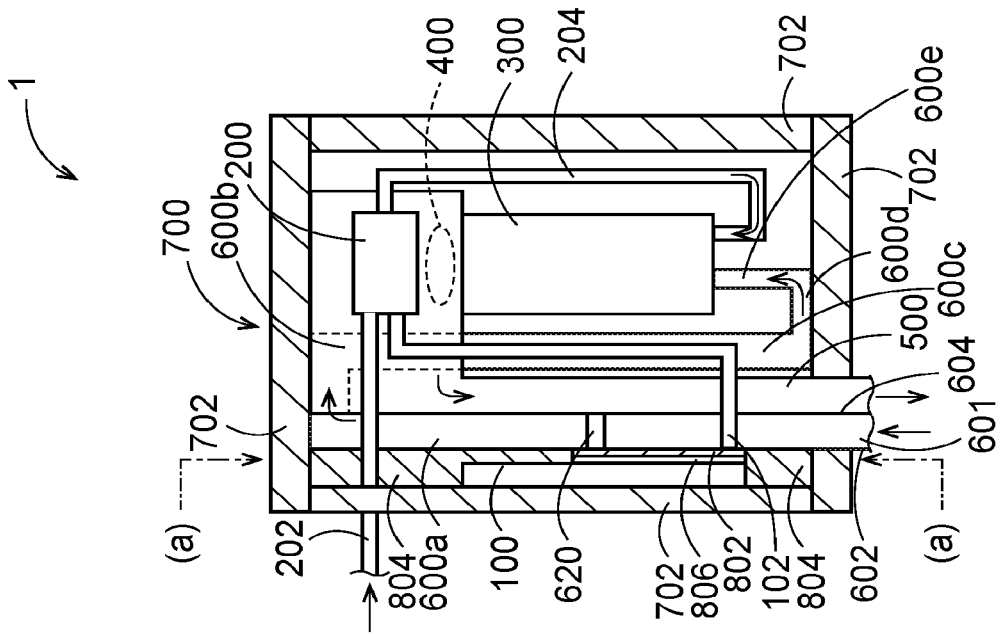
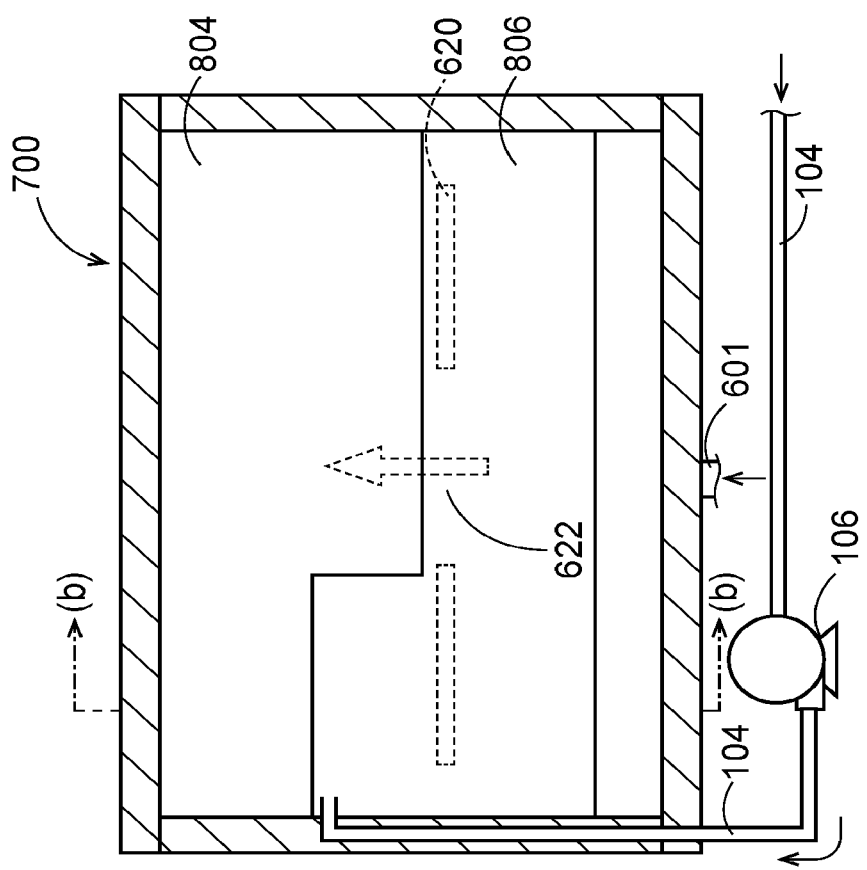
FIG.8B
FIG.8A

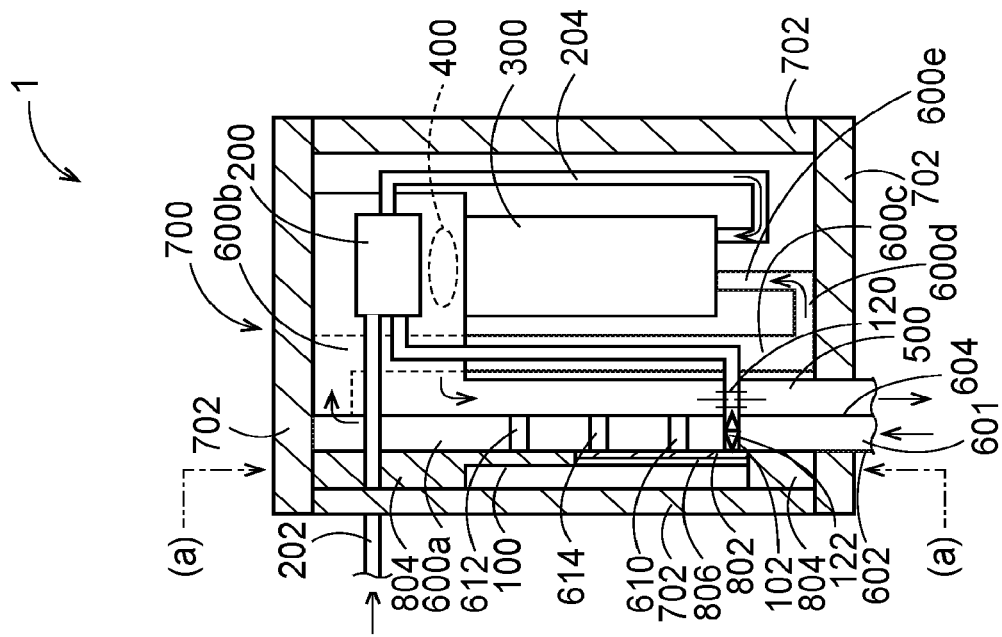
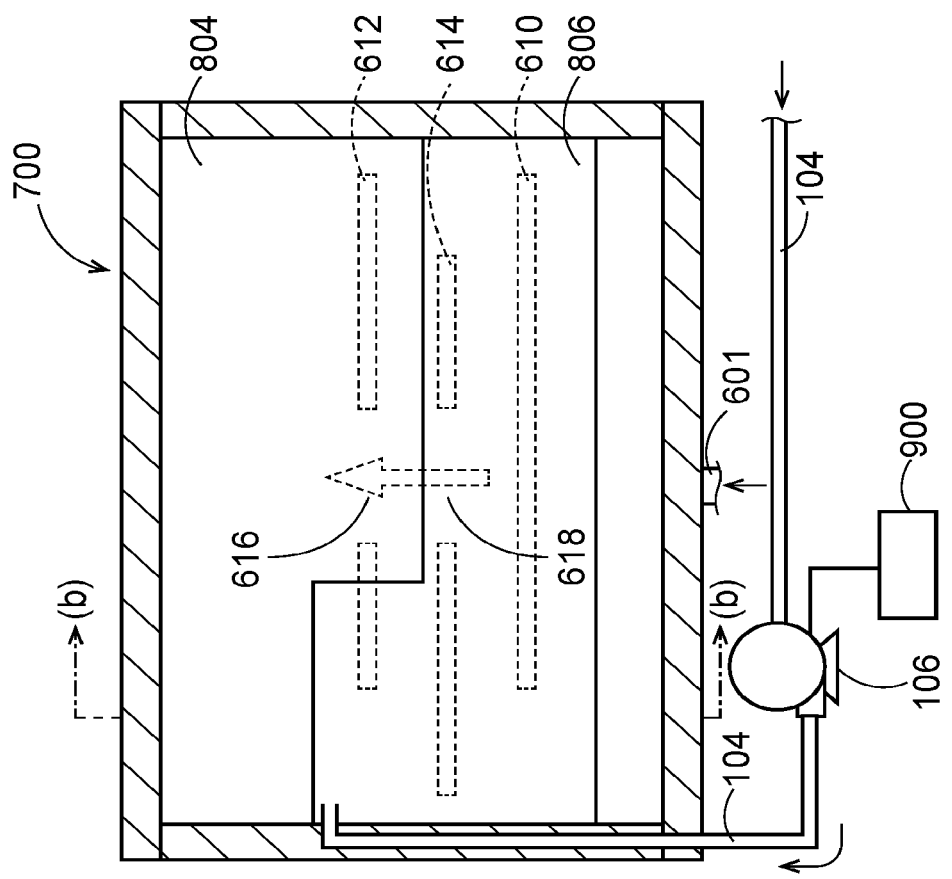
FIG.9B
FIG.9A

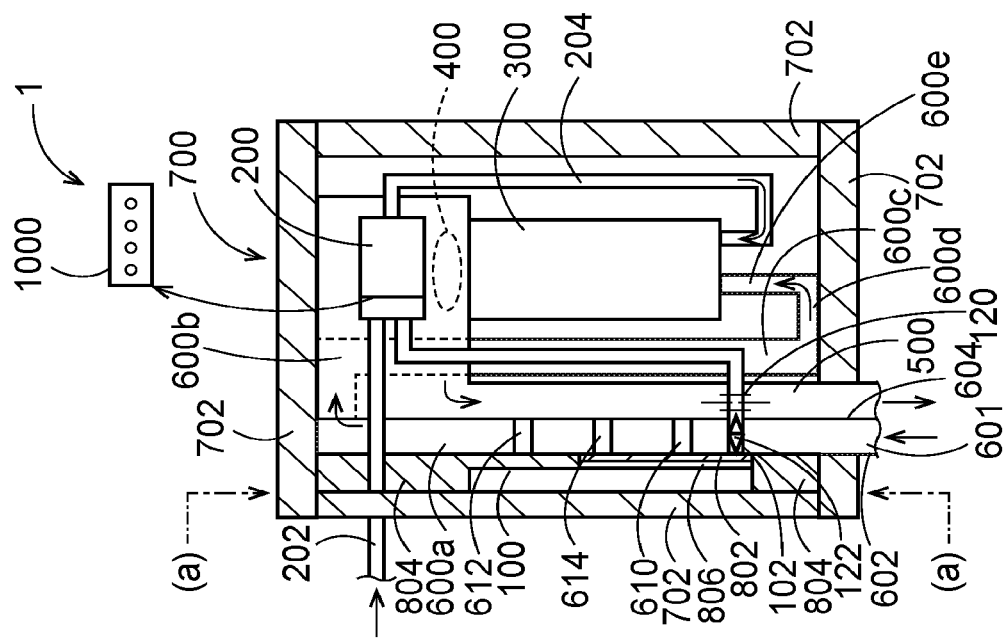
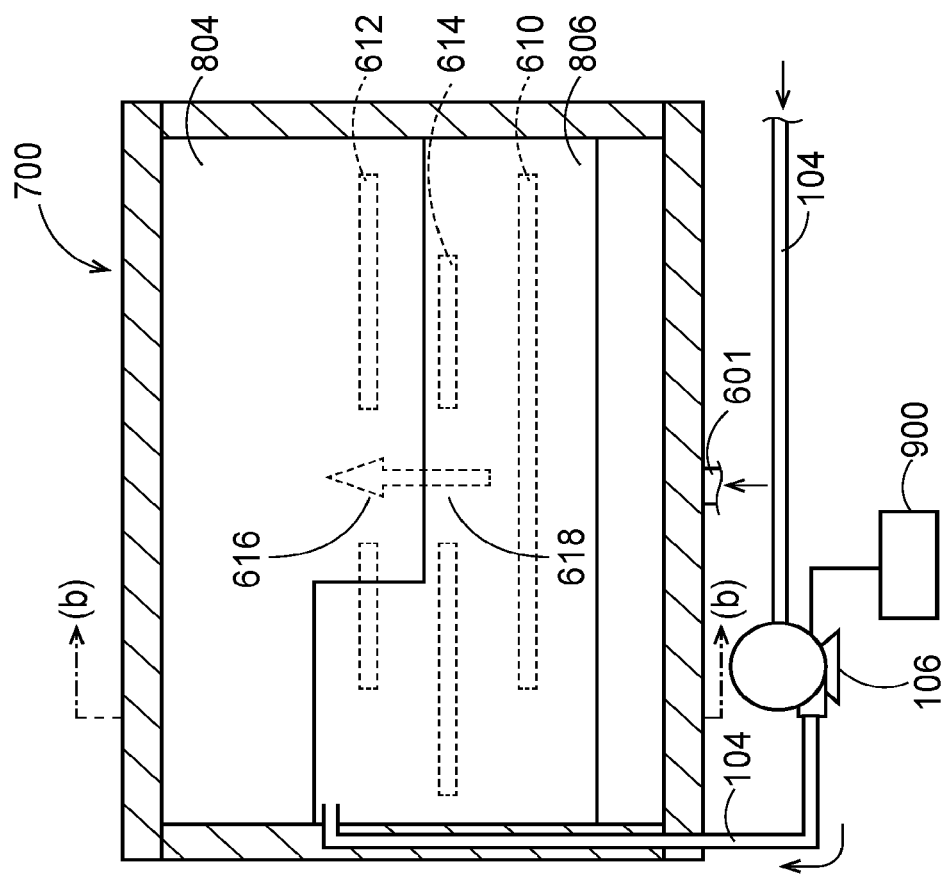
FIG.11B
FIG.11A

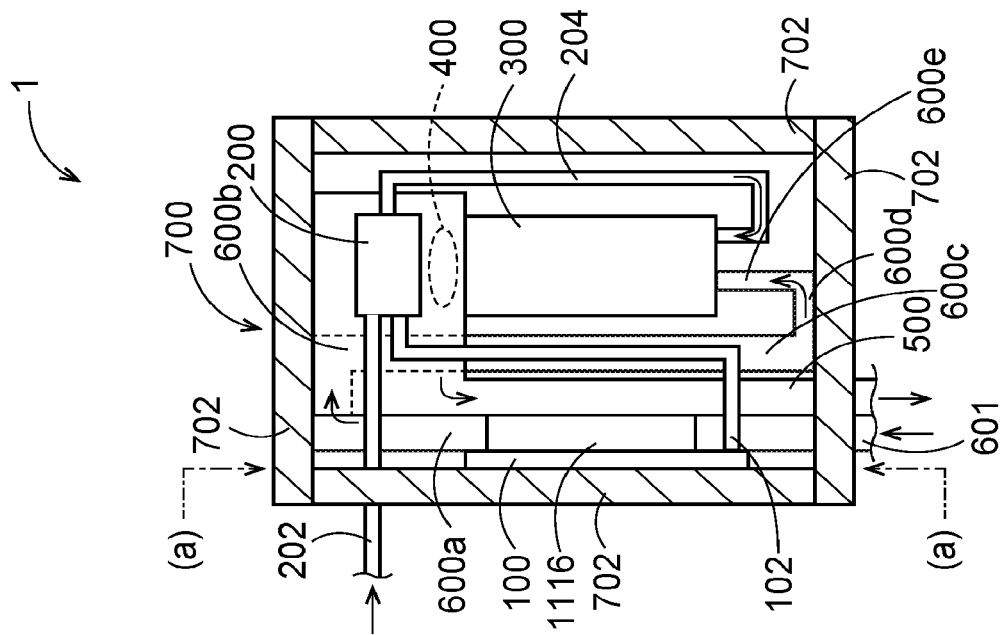
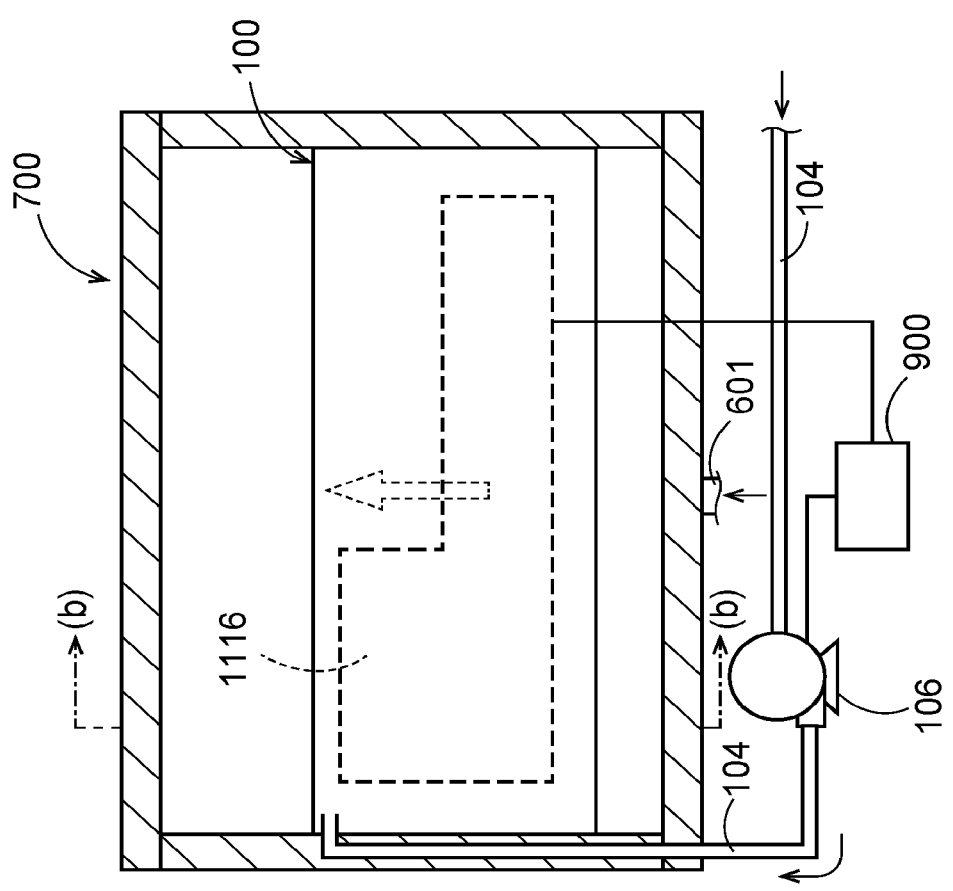
FIG.13B
FIG.13A

FUEL CELL MODULE WITH HYDRODESULFURIZER AND PREHEATING

CROSS-REFERENCE TO RELATED APPLICATIONS

This application is based upon and claims the benefit of priority from the prior Japanese Patent Application No. 2016-169802, filed on Aug. 31, 2016, and the prior Japanese Patent Application No. 2017-102843, filed on May 24, 2017 the entire contents of which are incorporated herein by reference.

FIELD

Embodiments of the present invention relate to a fuel cell module.

BACKGROUND

As a next-generation power generation system, a fuel cell module is known that generates electric power using a hydrogen-containing gas and an oxygen-containing gas. The fuel cell module includes a solid oxide fuel cell housed in a package thereof.

As the hydrogen-containing gas to be supplied to the solid oxide fuel cell, a fuel gas such as natural gas or petroleum gas, which are distributed commonly, is used. When a sulfur component contained in the fuel gas is supplied to a reforming catalyst or the solid oxide fuel cell, it degrades the reforming catalyst or the solid oxide fuel cell. Therefore, a reformer or the solid oxide fuel cell is supplied with a fuel gas that is desulfurized with a desulfurizer. In the desulfurizer, a catalyst for normal temperature desulfurization is generally used.

To reduce the desulfurizer in size, a hydrodesulfurization catalyst, which is higher in efficiency of desulfurization per volume than the catalyst for normal temperature desulfurization, is used. To use the hydrodesulfurization catalyst, a heat source of 200 to 400° C. is needed. Furthermore, when liquid such as water enters the hydrodesulfurization catalyst, the liquid may degrade the hydrodesulfurization catalyst when it vaporizes, decreasing the efficiency of desulfurization.

An objective of the present invention is to provide a fuel cell module in which the efficiency of desulfurization in a hydrodesulfurizer can be enhanced.

BRIEF DESCRIPTION OF THE DRAWINGS

FIG. 1A is a lateral cross sectional view of a fuel cell module according to a first embodiment;

FIG. 1B is a front cross sectional view of the fuel cell module according to the first embodiment;

FIG. 2 is a table showing temperatures measured at locations (INLET, T2, T3, OUTLET) illustrated in FIG. 1;

FIG. 3A is a lateral cross sectional view of a fuel cell module according to a second embodiment;

FIG. 3B is a front cross sectional view of the fuel cell module according to the second embodiment;

FIG. 4A is a lateral cross sectional view of a fuel cell module according to a third embodiment;

FIG. 4B is a front cross sectional view of the fuel cell module according to the third embodiment;

FIG. 5A is a lateral cross sectional view of a fuel cell module according to a fourth embodiment;

FIG. 5B is a front cross sectional view of the fuel cell module according to the fourth embodiment;

FIG. 6A is a lateral cross sectional view of a fuel cell module according to a fifth embodiment;

FIG. 6B is a front cross sectional view of the fuel cell module according to the fifth embodiment;

FIG. 8A is a lateral cross sectional view of a fuel cell module according to a seventh embodiment;

FIG. 8B is a front cross sectional view of the fuel cell module according to the seventh embodiment;

FIG. 9A is a lateral cross sectional view of a fuel cell module according to an eighth embodiment;

FIG. 9B is a front cross sectional view of the fuel cell module according to the eighth embodiment;

FIG. 11A is a lateral cross sectional view of a fuel cell module according to a ninth embodiment;

FIG. 11B is a front cross sectional view of the fuel cell module according to the ninth embodiment;

FIG. 13A is a lateral cross sectional view of a fuel cell module according to an eleventh embodiment; and FIG. 13B is a front cross sectional view of the fuel cell module according to the eleventh embodiment.

DETAILED DESCRIPTION

Figure 7B:
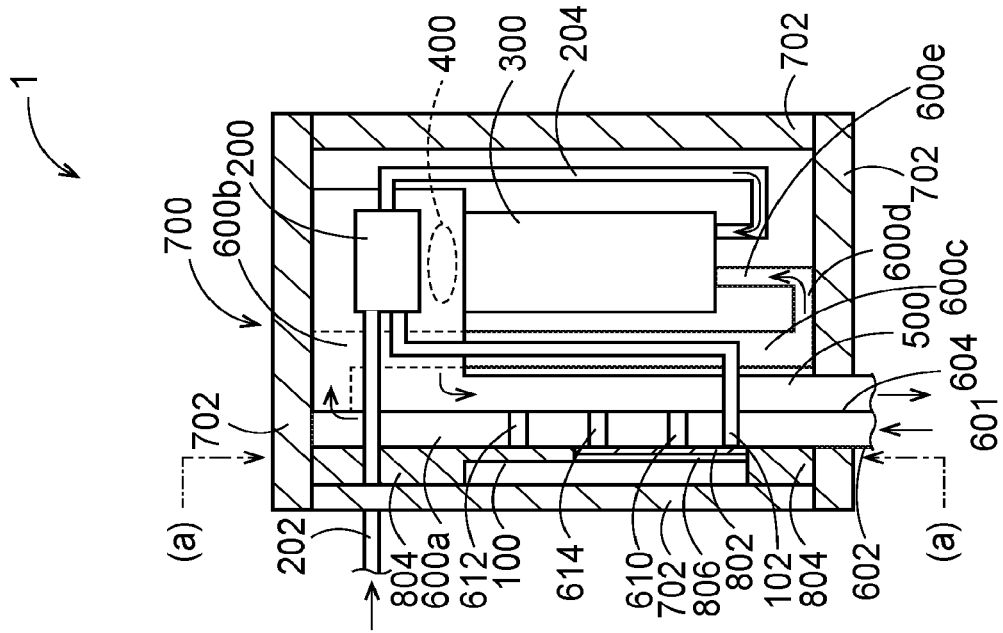
FIG. 7B is a front cross sectional view of the fuel cell module according to the sixth embodiment.

A fuel cell module according to the present embodiment includes a hydrodesulfurizer, a cell stack, an exhaust gas channel portion, and an air-preheating channel portion. The hydrodesulfurizer is configured to desulfurize fuel gas using a hydrodesulfurization catalyst. A reformer is configured to generate a hydrogen-containing gas using the desulfurized fuel gas. The cell stack is constituted by stacking a plurality of fuel cells and is configured to generate electric power using the hydrogen-containing gas and an oxygen-containing gas. The exhaust gas channel portion is configured to discharge the hydrogen-containing gas that is not consumed by the cell stack, and discharge exhaust gas that is generated by the combustion of the oxygen-containing gas. The air-preheating channel portion is an air-preheating channel portion that is disposed so as to be adjacent to the exhaust gas channel portion and that is configured to preheat the oxygen-containing gas through heat exchange with the exhaust gas channel portion. The air-preheating channel portion is disposed between the hydrodesulfurizer and the cell stack.

Embodiments will now be explained with reference to the accompanying drawings.

Hereinafter, embodiments of the present invention will be explained with reference to the accompanying drawings. The present embodiments are not intended to limit the present invention.

First Embodiment

A fuel cell system according to a first embodiment includes an air-preheating channel portion disposed between a hydrodesulfurizer and a cell stack and adjusts the flow of an oxygen-containing gas in the air-preheating channel portion, whereby heat conducted from the air-preheating channel portion to the hydrodesulfurizer is homogenized, so that the efficiency of desulfurization is enhanced. Explanation will be made below more in detail.

(Configuration)

FIGS. 1A and 1B are schematic views showing a configuration of a fuel cell module 1 according to the first embodiment. FIG. 1A is a lateral cross sectional view of the fuel cell module 1, and FIG. 1B is a front cross sectional view of the fuel cell module 1.

As illustrated in FIG. 1A and FIG. 1B, the fuel cell module 1 generates electric power using a hydrogen-containing gas and an oxygen-containing gas, the hydrogen-containing gas being generated by reforming a hydrocarbon-based fuel. More specifically, the fuel cell module 1 includes a hydrodesulfurizer 100, a reformer 200, a cell stack 300, a burner 400, an exhaust gas channel portion 500, an air-preheating channel portion 600, and a package 700.

The hydrodesulfurizer 100 is configured to desulfurize a fuel gas using a hydrodesulfurization catalyst. That is, the hydrodesulfurizer 100 functions at 200 to 400° C., desulfurizing a fuel gas to which an odorant such as sulfur is added, so as to remove a sulfur component, whereby a desulfurized fuel gas is generated. The configuration thereof will be explained later more in detail.

The desulfurized fuel gas pipe 102 extends horizontally from the hydrodesulfurizer 100, then extends in a vertically upward direction, and communicates with the reformer 200. With this configuration, the hydrodesulfurizer 100 supplies the desulfurized fuel gas generated by the hydrodesulfurizer 100 to the reformer 200 through the desulfurized fuel gas pipe 102. In addition, the desulfurized fuel gas pipe 102 has an inner diameter enough to block water by means of capillary force. The inner diameter is, for example, 4.35 mm (an outer diameter is ¼ inch).

More specifically, the stream of the desulfurized fuel gas in the desulfurized fuel gas pipe 102 is always directed from the hydrodesulfurizer 100 to the reformer 200 in a horizontal or the vertically upward direction. That is, the stream of the desulfurized fuel gas is not directed in a vertically downward direction; besides, the desulfurized fuel gas pipe 102 has a size that is small enough to block water by means of capillary force. In addition, the desulfurized fuel gas pipe 102 is supplied with water after the supply of the desulfurized fuel gas to the hydrodesulfurizer 100 is stopped. With this supply, the capillary force possessed by the desulfurized fuel gas pipe 102 blocks an outlet of the hydrodesulfurizer 100.

The reformer 200 is supplied with water through a water supply pipe 202. The water supply pipe 202 merges with the desulfurized fuel gas pipe 102 at a confluence 203. The reformer 200 is configured to generate steam from the water supplied through the water supply pipe 202. Specifically, the reformer 200 functions at 400 to 700° C. and generates a hydrogen-containing gas using the water supplied through the water supply pipe 202 and the desulfurized fuel gas supplied through the desulfurized fuel gas pipe 102. The hydrogen-containing gas is supplied to the cell stack 300 through the reformer 200 and a hydrogen gas pipe 204 that communicates with the cell stack 300.

As a reforming catalyst provided inside the reformer 200, for example, a reforming catalyst in which a noble metal such as Ru (ruthenium) and Pt (platinum) and a base material such as Ni (nickel) and Fe (iron) are supported in a porous support such as alumina and cordierite, or another reforming catalyst, is used. If the temperature of the reformer 200 is not increased sufficiently, gasses constituted by two or more of carbon atoms (C2 or higher), such as propane and ethane, are not reformed sufficiently. In this case, when the gasses constituted by two or more of carbon atoms are supplied to the cell stack 300, precipitation of carbon may occur in the cell stack 300, degrading the cell stack 300.

The cell stack 300 is constituted by stacking a plurality of fuel cells and is configured to generate electric power using the hydrogen-containing gas supplied from the reformer 200 and the oxygen-containing gas (air) supplied via the air-preheating channel portion 600. The fuel cells mentioned here are stacked in a direction from the front to the depth of FIG. 1B, that is, in a width direction of FIG. 1A.

In the present embodiment, the fuel cells of the cell stack 300 are each made up of a solid oxide fuel cell that operates at a high temperature of, for example, 500 to 1000° C. The plurality of fuel cells are electrically connected to each other. In addition, the fuel cells each include a fuel electrode and an oxidant electrode. The plurality of fuel cells generate electric power by the reaction expressed by Chemical Formula 1. The hydrogen-containing gas streams through a gas passage on a fuel-electrode side, inducing a fuel-electrode reaction. The oxygen-containing gas streams through a gas passage on an oxidant electrode side, inducing an oxidant electrode reaction.

Fuel-electrode reaction: $H_2 + O^{2-} \rightarrow 2H^+ + 2e^-$ $CO + O^{2-} \rightarrow CO_2 + 2e^-$ Oxidant electrode reaction: $O_2 + 4e^- \rightarrow 2O^{2-}$ (Chemical Formula 1)

The burner 400 is a space between an upper portion of the cell stack 300 and the reformer 200. The burner 400 burns the hydrogen-containing gas that is not consumed by the cell stack 300, and the oxygen-containing gas, and discharges the resultant exhaust gas to the exhaust gas channel portion 500. The heat of the combustion heats the reformer 200, advancing a reforming reaction. This inhibits the above-described precipitation of carbon in the cell stack 300.

The exhaust gas channel portion 500 is configured to discharge exhaust gas generated in the burner 400 to an outside of the fuel module. That is, the exhaust gas channel portion 500 is configured to discharge the hydrogen-containing gas that is not consumed by the cell stack 300, and discharge exhaust gas that is generated by the combustion of the oxygen-containing gas. The exhaust gas channel portion 500 and the cell stack 300 are not in contact with each other except for at an upper end of the cell.

The air-preheating channel portion 600 is disposed so as to be adjacent to the exhaust gas channel portion 500 and is configured to preheat the oxygen-containing gas to be supplied to the cell stack 300, through heat exchange with the exhaust gas channel portion 500. The air-preheating channel portion 600 is disposed between the hydrodesulfurizer 100 and the cell stack 300. That is, the air-preheating channel portion 600 is in contact with the hydrodesulfurizer 100 directly or with a wall insulator interposed therebetween. In addition, with at least part of the air-preheating channel portion 600, one side of the cell stack 300 is covered, with the exhaust gas channel portion 500 interposed therebetween.

More specifically, at least part of the air-preheating channel portion 600 has a planar, hollowed shape, with which the one side of the hydrodesulfurizer 100 is covered, and includes an air channel that homogenizes distribution of heat conducted to the hydrodesulfurizer 100. Through the air channel, the oxygen-containing gas streams in from an air inlet pipe 601. The air inlet pipe 601 is disposed in a lower portion of a central portion in the planar, hollowed shape. That is, the air-preheating channel portion 600 includes a first air-preheating channel portion 600a, a second air-preheating channel portion 600b, a third air-preheating channel portion 600c, a fourth air-preheating channel portion 600d, and a fifth air-preheating channel portion 600e. Specifically, the first air-preheating channel portion 600a extends from the lower portion to the upper portion of the fuel cell module 1 between the hydrodesulfurizer 100 and the exhaust gas channel portion 500, and the second air-preheating channel portion 600b is disposed in the upper portion. The third air-preheating channel portion 600c turns back at the upper portion and extends up to a lower face of the cell stack 300, the fourth air-preheating channel portion 600d is disposed in the lower portion, and the fifth air-preheating channel portion 600e communicates with the gas passage on an oxidant electrode side in the fuel cell. Of the air-preheating channel portion 600, the third air-preheating channel portion 600c, the fourth air-preheating channel portion 600d, and the fifth air-preheating channel portion 600e do not perform heat exchange with the exhaust gas channel portion 500.

In such a manner, air, which is the oxygen-containing gas, is supplied to the air inlet pipe 601 positioned in the lower portion of the fuel cell module 1, in the vicinity of a center of the cell stack 300 in a stacking direction of the cell stack 300. The air streams through the air-preheating channel portion 600 around the cell stack 300 and is heated through heat exchange with the exhaust gas channel portion 500. The heated air is supplied to the cell stack 300 from the lower portion of the cell stack 300.

The package 700 houses the hydrodesulfurizer 100, the reformer 200, the cell stack 300, the burner 400, the exhaust gas channel portion 500, and the air-preheating channel portion 600. The package 700 includes an outer insulator 702.

Next, based on FIG. 1A, the configuration of the hydrodesulfurizer 100 will be explained in detail. As illustrated in FIG. 1A, a fuel blower 106 communicates with the hydrodesulfurizer 100 through a fuel gas pipe 104.

The fuel blower 106 supplies hydrogen and a hydrocarbon-based fuel gas that contains sulfur to the hydrodesulfurizer 100 through the fuel gas pipe 104. The fuel gas pipe 104 passes inside the outer insulator 702 in the package 700 until supplying fuel gas from the fuel blower 106 to the hydrodesulfurizer 100. This causes the fuel gas to receive heat from the fuel cell module 1 to be preheated.

The fuel gas supplied through the fuel gas pipe 104 is a gas mainly containing hydrocarbon, such as a city gas (CNG) and a liquefied petroleum gas (LPG) that mainly contain a natural gas as their raw materials. The city gas (CNG) has a composition including, for example, 88% of methane, 7% of ethane ($C_2H_6$), 4% of propane ($C_3H_8$), and 1% of butane ($C_4H_{10}$). The fuel gas pipe 104 is connected to a city gas line, an LPG line, a hydrogen line, or the like.

The hydrodesulfurizer 100 is partitioned off with punched metals 108, and sections that are not filled with hydrodesulfurization catalysts are provided in the upper portion and the lower portion of the hydrodesulfurizer 100. A section partitioned off by the punched metals 108 is divided into three catalyst chambers 110, 112, and 114, each of which is filled with a hydrodesulfurization catalyst. Furthermore, in each of boundaries between the three catalyst chambers 110, 112, and 114, partition plates 116 and 118 are placed. With this configuration, the fuel gas does not bypass the sections that are not filled with hydrodesulfurization catalysts, and the fuel gas is caused to meander the three catalyst chambers 110, 112, and 114 in this order.

The fuel gas having meandered the three catalyst chambers 110, 112, and 114 in this order streams out to the desulfurized fuel gas pipe 102. At the locations denoted by INLET, T2, T3, OUTLET, thermocouples serving as thermometers are placed, and the temperatures of INLET, T2, T3, OUTLET are measured.

The hydrodesulfurizer 100 is in contact with the outer insulator 702 that is made of a high-performance insulator such as Microtherm and WDS.

(Action)

Since the cell stack 300 generates electric power at 500 to 1000° C., the resultant exhaust gas reaches 500 to 1000° C. in the burner 400. Due to heat dissipation in end portions of the cell stack 300 and heat generation in the cell stack 300, the vicinity of the center of the cell stack 300 in the stacking direction reaches the most elevated temperature. The heat of the exhaust gas streaming through the exhaust gas channel portion 500 provided along a side face of this cell stack 300 and the heat of the oxygen-containing gas streaming through the air-preheating channel portion 600 perform heat exchange with each other. Therefore, the air-preheating channel portion 600 reflects a temperature distribution of the cell stack 300, and as to a temperature distribution conducted to the air-preheating channel, the vicinity of the center of the cell stack 300 in the stacking direction reaches the most elevated temperature.

Since the air inlet pipe 601 of the air-preheating channel portion 600 is placed in the vicinity of the center of the cell stack 300 in the stacking direction, the amount of the oxygen-containing gas streaming along the central portion of the cell stack 300 in the stacking direction is larger than the amount of the oxygen-containing gas streaming along the end portions of the cell stack 300. This causes the stream of the oxygen-containing gas at a relatively low temperature to be concentrated in the center of the cell stack 300 in the stacking direction. This homogenizes the temperature distribution of the air-preheating channel portion 600, which in turn homogenizes a distribution of the heat conduction to the hydrodesulfurizer 100.

As described above, the resultant exhaust gas is at a high temperature of 500 to 1000° C. Thus, when the hydrodesulfurizer 100 is placed in the exhaust gas channel portion 500, it is difficult to keep the hydrodesulfurizer 100 at a temperature at which the hydrodesulfurization catalysts can perform the desulfurization appropriately.

(Effect)

As seen from the above, in the fuel cell module 1 according to the first embodiment, the air inlet pipe 601 of the air-preheating channel portion 600 is placed in the vicinity of the center of the cell stack 300 in the stacking direction. Therefore, the stream of the oxygen-containing gas at a relatively low temperature is concentrated in the center of the cell stack 300 in the stacking direction, and the temperature distribution of the air-preheating channel portion 600 is homogenized. This homogenizes the distribution of the heat conduction from the air-preheating channel portion 600 to the hydrodesulfurizer 100, which thereby enables a range of the temperatures of the hydrodesulfurization catalysts in the hydrodesulfurizer 100 to be kept appropriately.

Furthermore, the upper portion and the lower portion of the hydrodesulfurizer 100 are partitioned off with the punched metals 108. This configuration reduces a pressure drop of the fuel gas, which makes the fuel gas stream easily. Therefore, the fuel gas streams into each of the catalyst chambers 110, 112, and 114 after the stream thereof are homogenized, and the fuel gas is discharged from each of the hydrodesulfurization catalysts uniformly. It is thereby possible to effectively desulfurize the fuel gas streaming in the hydrodesulfurizer 100, and to homogenize the temperature distribution in the hydrodesulfurizer 100.

FIG. 2 is a table showing the temperatures measured at the locations (INLET, T2, T3, OUTLET) illustrated in FIG. 1. As shown in a column HM22 in FIG. 2, the temperature in the hydrodesulfurizer 100 is kept from 200 to 400° C. Note that the temperature in the hydrodesulfurizer 100 in second to seventh embodiments, which will be explained later, are also measured at the locations (INLET, T2, T3, OUTLET) illustrated in FIG. 1. FIG. 2 is a list of test results with the same amount of fuel stream, the same amount of air stream, the same amount of water stream, after the same elapsed time, and at the same measurement points in the hydrodesulfurizer.

In addition, the hydrodesulfurizer 100 is placed across the single outer insulator 702, which provides easy access to the hydrodesulfurizer 100, facilitating the maintenance thereof.

Second Embodiment

A fuel cell module according to a second embodiment differs from that in the first embodiment in that a low-performance wall insulator is placed between the hydrodesulfurizer and the air-preheating channel. Differences from the first embodiment will be explained below.
(Configuration)

FIGS. 3A and 3B are schematic views showing a configuration of a fuel cell module 1 according to the second embodiment. FIG. 3A is a lateral cross sectional view of the fuel cell module 1. FIG. 3B is a front cross sectional view of the fuel cell module 1. The same components as those in the first embodiment are denoted by the same reference characters, and the explanation thereof will not be made. In the first embodiment, the hydrodesulfurizer 100 and the air-preheating channel portion 600 are in direct contact with each other, but the present embodiment differs in that a low-performance wall insulator 802 is disposed between the hydrodesulfurizer 100 and the air-preheating channel portion 600.

As illustrated in FIGS. 3A and 3B, high-performance wall insulators 800 are placed on the top and the bottom of the hydrodesulfurizer 100, and the low-performance wall insulator 802 is placed between the hydrodesulfurizer 100 and the air-preheating channel. The insulating performance of the high-performance wall insulators 800 is the same as that of the outer insulator 702 of the package 700. The insulating performance of the low-performance wall insulator 802 is lower than that of the outer insulator 702 of the package 700 and lower than that of the high-performance wall insulators 800. The low-performance wall insulator 802 is, for example, a blanket-like insulator such as Superwool Plus from Shin-Nippon Thermal Ceramics Corporation and TOMBO from NICHIAS Corporation. The low-performance wall insulator 802 reduces heat conducted from the air-preheating channel portion 600 to the hydrodesulfurizer 100. The thickness of the outer insulator 702 is reduced by the thickness of the low-performance wall insulator 802. With this configuration, the outside dimensions of the entire fuel cell module 1 remain unchanged.
(Action)

Since the hydrodesulfurizer 100 is in contact with the air-preheating channel portion 600 with the low-performance wall insulator 802 interposed therebetween, the quantity of received heat is reduced. In addition, since the high-performance wall insulators 800 are disposed in the upper portion and the lower portion of the hydrodesulfurizer 100, the quantity of heat conducted from the air-preheating channel portion 600 to the hydrodesulfurizer 100 is reduced.
(Effect)

As seen from the above, in the fuel cell module 1 according to the second embodiment, the low-performance wall insulator 802 is disposed between the hydrodesulfurizer 100 and the air-preheating channel portion 600. With this configuration, it is possible to reduce the quantity of received heat of the hydrodesulfurizer 100 and to reduce the temperature in the hydrodesulfurizer 100 even more. In addition, the high-performance wall insulators 800 are disposed in the upper portion and the lower portion of the hydrodesulfurizer 100. With this configuration, it is possible to reduce the quantity of heat conducted from the air-preheating channel portion 600 to the hydrodesulfurizer 100 even more.

As shown in a column HM25 in FIG. 2, the maximum temperature of the hydrodesulfurizer 100 is reduced to 335° C., which enables the temperature of the hydrodesulfurizer 100 to be brought close to a temperature from 200 to 320° C. at which the hydrodesulfurization catalysts perform the desulfurization more efficiently.

Third Embodiment

A fuel cell module according to a third embodiment differs from that in the second embodiment in that the air-preheating channel portion includes a meandering channel. Differences from the second embodiment will be explained below.
(Configuration)

FIGS. 4A and 4B are schematic views showing a configuration of a fuel cell module 1 according to the third embodiment. FIG. 4A is a lateral cross sectional view of a fuel cell module 1, and FIG. 4B is a front cross sectional view of the fuel cell module 1. The same components as those in the second embodiment are denoted by the same reference characters, and the explanation thereof will not be made.

As illustrated in FIGS. 4A and 4B, the air-preheating channel portion 600 at least includes a first channel plate 602, a second channel plate 604, a first partitioning portion 606, a second partitioning portion 608, and a third partitioning portion 610.

The first channel plate 602 is made of a plate-like material. Similarly, the second channel plate 604 is made of a plate-like material. The first channel plate 602 and the second channel plate 604 are in parallel to each other. The partitioning portions 606, 608, and 610 are each made of a plate having a thickness that fills a gap between the first channel plate 602 and the second channel plate 604. The partitioning portions 606, 608, and 610 may be each made of a round bar, which is fixed by spot welding, plug welding, and circumferential welding so that it fills the gap between the two channel plates. Alternatively, one or both of the two channel plates 602 and 604 may be subjected to pressing to be bent, forming contact surfaces, on which the partitioning portions 606, 608, and 610 may be fixed by spot welding, plug welding, and circumferential welding. In the case of performing the pressing, the meandering channel can be formed without performing welding.

As illustrated in FIG. 4A, a clearance between one end portion of each of the partitioning portions 606, 608, and 610 and the side wall of the air-preheating channel portion 600 differs from a clearance between the other end portion thereof and the side wall of the air-preheating channel portion 600. In addition, the position of a larger clearance between the end portion of each of the partitioning portions 606, 608, and 610 and the side wall of the air-preheating channel portion 600 is made different alternately among the partitioning portions 606, 608, and 610. This configuration forms the meandering channel through which air meanders laterally, as illustrated by arrows. Furthermore, by means of spaces on both sides of the meandering channel, the pressure drop is adjusted so as not to exceed a predetermined value.
(Action)

Since air streams along the meandering channel, air at a relatively low temperature streams along the entire side face of the hydrodesulfurizer 100, whereby the temperature in the hydrodesulfurizer 100 decreases as a whole.
(Effect)

As seen from the above, in the fuel cell module 1 according to the third embodiment, the meandering channel is formed in the air-preheating channel portion 600. With this configuration, since air streams along the entire side face of the hydrodesulfurizer 100, the temperature in the hydrodesulfurizer 100 can be reduced as a whole more uniformly. As illustrated in column HM41 in FIG. 2, the temperature in the hydrodesulfurizer 100 can be kept at a temperature from 200 to 320° C. at which the hydrodesulfurization catalysts perform the desulfurization more efficiently.

Fourth Embodiment

A fuel cell module according to a fourth embodiment differs from that in the third embodiment in that the insulating performance of the insulator placed between the hydrodesulfurizer and the air-preheating channel portion is changed based on the temperature distribution of the air-preheating channel portion. Differences from the third embodiment will be explained below.
(Configuration)

FIGS. 5A and 5B are schematic views showing a configuration of a fuel cell module 1 according to the fourth embodiment. FIG. 5A is a lateral cross sectional view of a fuel cell module 1, and FIG. 5B is a front cross sectional view of the fuel cell module 1. The same components as those in the third embodiment are denoted by the same reference characters, and the explanation thereof will not be made.

As illustrated in FIGS. 5A and 5B, a wall insulator disposed between the hydrodesulfurizer 100 and the air-preheating channel portion 600 includes the low-performance wall insulator 802 and high-performance wall insulators 804. The high-performance wall insulators 804 are disposed at positions corresponding to those midstream and downstream of the hydrodesulfurizer 100.
(Action)

The positions of the air-preheating channel portion 600 corresponding to those midstream and downstream of the hydrodesulfurizer 100 are at higher temperatures than the temperatures of the other positions, and gas streaming through the positions midstream and downstream of the hydrodesulfurizer is also at a sufficiently high temperature. In such a manner, the high-performance wall insulators 804 are disposed so that the positions thereof correspond to the positions at higher temperatures in the air-preheating channel portion 600, and thus heat conducted from the air-preheating channel portion 600 to the hydrodesulfurizer 100 is homogenized even more.
(Effect)

In the fuel cell module 1 according to the fourth embodiment, the insulating performance of the insulator placed between the hydrodesulfurizer 100 and the air-preheating channel portion 600 is changed based on the temperature distribution of the air-preheating channel portion 600. With this configuration, the quantities of received heat in high temperature portions (midstream and downstream regions) of the hydrodesulfurizer 100 are made even smaller. Therefore, it is possible to reduce the temperatures in the high temperature portions of the hydrodesulfurizer 100, and to homogenize the temperature distribution of the hydrodesulfurizer 100 as a whole. As illustrated in column HM41 in FIG. 2, the temperature in the hydrodesulfurizer 100 can be kept at a temperature from 200 to 320° C. at which the hydrodesulfurization catalysts perform the desulfurization more efficiently.

Fifth Embodiment

A fuel cell module according to a fifth embodiment differs from that in the fourth embodiment in that a space through which air streams is formed in a central portion of the meandering channel in the air-preheating channel portion. Differences from the fourth embodiment will be explained below.
(Configuration)

FIGS. 6A and 36 are schematic views showing a configuration of a fuel cell module 1 according to the fifth embodiment. FIG. 6A is a lateral cross sectional view of a fuel cell module 1, and FIG. 6B is a front cross sectional view of the fuel cell module 1. The same components as those in the fourth embodiment are denoted by the same reference characters, and the explanation thereof will not be made.

As illustrated in FIG. 6A, the fuel cell module 1 according to the fifth embodiment differs from that in the fourth embodiment in that a space through which air streams is provided in central portions 616 and 618 of the upper two partitioning portions 612 and 614.
(Action)

By providing the space in the central portions 616 and 618 of the upper two partitioning portions 612 and 614, air streams along the vicinity of the center of the cell stack 300 in the stacking direction more concentratedly.
(Effect)

As seen from the above, in the fuel cell module 1 according to the fifth embodiment, the space through which air streams is formed in the central portions 616 and 618 of the meandering channel in the air-preheating channel portion 600. With this configuration, air streams more concentratedly through the vicinity of the center of the cell stack 300 in the stacking direction. Thus, the temperature in the midstream portion of the hydrodesulfurizer 100 is reduced even more, and the temperature distribution of the hydrodesulfurizer 100 is homogenized even more. As shown in a column HM49 in FIG. 2, the temperature in the hydrodesulfurizer 100 can be kept at a temperature from 200 to 320° C. at which the hydrodesulfurization catalysts perform the desulfurization more effectively.

Sixth Embodiment

A fuel cell module according to a sixth embodiment differs from that in the fifth embodiment in that a copper plate is also placed on the insulator placed between the hydrodesulfurizer and the air-preheating channel portion. Differences from the fifth embodiment will be explained below.

(Configuration)

Figure 7A:
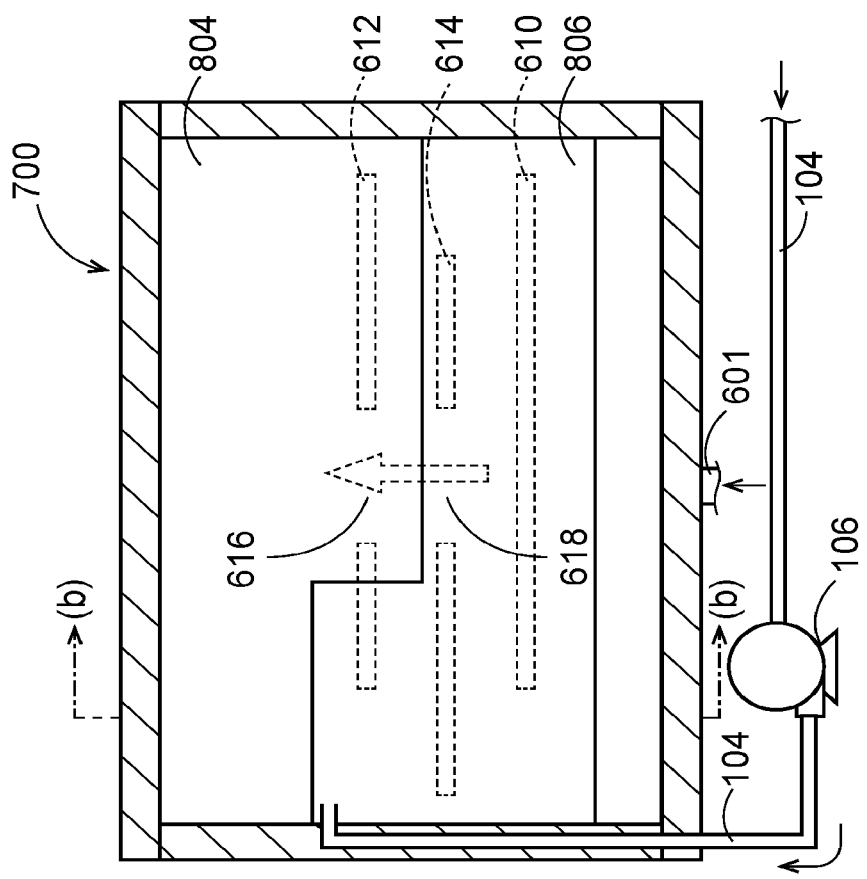
FIG. 7A is a lateral cross sectional view of a fuel cell module according to a sixth embodiment.

FIGS. 7A and 7B are schematic views showing a configuration of a fuel cell module 1 according to the sixth embodiment. FIG. 7A is a lateral cross sectional view of a fuel cell module 1, and FIG. 7B is a front cross sectional view of the fuel cell module 1. The same components as those in the fifth embodiment are denoted by the same reference characters, and the explanation thereof will not be made.

As illustrated in FIGS. 7A and 7B, a copper plate 806 is placed on the low-performance wall insulator 802 on a cell stack 300 side. That is, the copper plate 806 is placed between the wall insulator 802 on the cell stack 300 side and the hydrodesulfurizer 100. Here, the copper plate 806 is disposed so as to overlap the low-performance wall insulator 802. The copper plate 806 may be disposed so as to overlap also the high-performance wall insulators 804. Note that the copper plate 806 in the present embodiment equivalent to a high thermal conductive member.

(Action)

The hydrodesulfurizer 100 is in contact with also the copper plate 806. Having a good heat conductivity, the copper plate 806 has an action of conducting heat from a high temperature portion to a low temperature portion of the hydrodesulfurizer 100.

(Effect)

As seen from the above, in the fuel cell module 1 according to the sixth embodiment, the copper plate 806 is placed between the low-performance wall insulator 802 and the hydrodesulfurizer 100. With this configuration, the copper plate 806 conducts heat from a high temperature portion to a low temperature portion of the hydrodesulfurizer 100, and thus it is possible to homogenize the temperature distribution of the hydrodesulfurizer 100 even more. As illustrated in a column HM50 in FIG. 2, the temperature in the hydrodesulfurizer 100 can be kept at a temperature from 200 to 320° C. at which the hydrodesulfurization catalysts perform the desulfurization effectively.

Seventh Embodiment

A fuel cell module according to a seventh embodiment differs from that in the sixth embodiment in that the number of the partitioning portions forming the meandering channel in the air-preheating channel portion is one. Differences from the sixth embodiment will be explained below.

(Configuration)

FIGS. 8A and 8B are schematic views showing a configuration of a fuel cell module 1 according to the seventh embodiment. FIG. 8A is a lateral cross sectional view of a fuel cell module 1, and FIG. 8B is a front cross sectional view of the fuel cell module 1. The same components as those in the sixth embodiment are denoted by the same reference characters, and the explanation thereof will not be made.

As illustrated in FIGS. 8A and 8B, a partitioning portion 620 forms a space in a central portion 622 through which air streams. The space of the central portion 622 through which air streams is formed vertically upward of the air inlet pipe 601. In addition, clearances between both end portions of the partitioning portion 620 and the side wall of the air-preheating channel portion 600 are made the same at both end portions.

(Action)

The stream of air does not meander but is concentrated even more in the center of the cell stack 300 in the stacking direction, which causes the air to stream at high speed. Thus, a temperature rise of air streaming through the air-preheating channel portion 600 is inhibited.

(Effect)

In the fuel cell module 1 according to the seventh embodiment, the space is provided in the central portion 622 of the partitioning portion 620, and the partitioning portion 620 is made to have left-right symmetry. With this configuration, the stream of air does not meander, heat exchange with the exhaust gas is inhibited, and a rise in temperature of the air is suppressed. Thus, the temperature in the hydrodesulfurizer 100 decreases as a whole. As shown in a column HM54 in FIG. 2, the temperature in the hydrodesulfurizer 100 can be kept at a temperature from 200 to 320° C. at which the hydrodesulfurization catalysts perform the desulfurization more effectively.

Eighth Embodiment

A fuel cell module according to an eighth embodiment differs from that in the sixth embodiment in that a first orifice and a first filter are disposed in the desulfurized fuel gas pipe. Differences from the sixth embodiment will be explained below.

(Configuration)

FIGS. 9A and 9B are schematic views showing a configuration of a fuel cell module 1 according to the eighth embodiment. FIG. 9A is a lateral cross sectional view of a fuel cell module 1, and FIG. 9B is a front cross sectional view of the fuel cell module 1. The same components as those in the sixth embodiment are denoted by the same reference characters, and the explanation thereof will not be made.

As illustrated in FIGS. 9A and 9B, a first orifice 120 and a first filter 122 are disposed in the desulfurized fuel gas pipe 102. The first orifice 120 is a throttling device and adjusts a stream through the desulfurized fuel gas pipe 102, making the inside of the desulfurized fuel gas pipe 102 at a low pressure. In the present embodiment, the first orifice 120 is equivalent to a first throttling device.

The first filter 122 is made of a wire net, a blanket insulator, or the like. The first filter 122 is disposed between the outlet of the hydrodesulfurizer 100 and the first orifice 120. A controller 900 controls the driving of the fuel blower 106.

(Action)

The first orifice 120 suppresses the stream in the desulfurized fuel gas pipe 102, so as to reduce pulsation of the fuel gas by the fuel blower 106. When the electric power generation by the fuel cell module 1 is stopped, the oxygen-containing gas passes the cell stack 300 and the reformer 200, and diffuses into the hydrodesulfurizer 100. The oxygen-containing gas is oxygen-containing gas remaining in the burner 400 and oxygen-containing gas entering the fuel cell module 1 through the air-preheating channel portion 600. In this case, the first orifice 120 inhibits the diffusion of oxygen into the hydrodesulfurizer 100. This inhibits mixing of the oxygen-containing gas into the hydrodesulfurizer 100. Note that the hydrodesulfurizer 100 is used as it is reduced with hydrogen. Therefore, mixing of a lot of oxygen on every stop of the electric power generation leads to the degradation of the hydrodesulfurization catalysts.

The first filter 122 absorbs powder of hydrodesulfurization catalysts that streams out together with the stream of desulfurized fuel gas. This inhibits a blockage of the first orifice 120 by the powder of the hydrodesulfurization catalysts.

Figure 10:
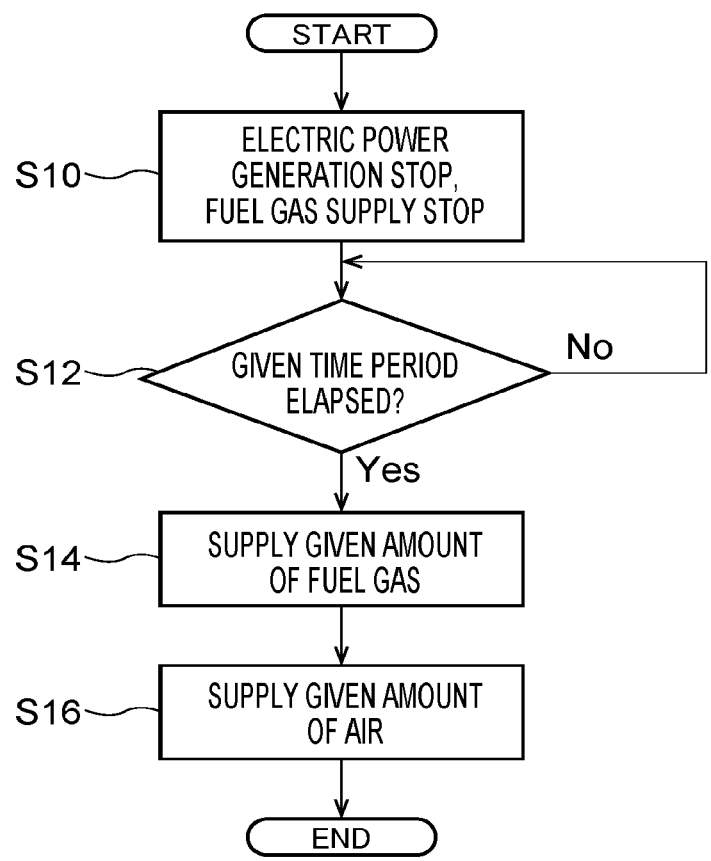
FIG. 10 is a diagram illustrating a flowchart of drive control of a fuel blower.

With reference to FIG. 10, drive control of the fuel blower 106 after the electric power generation is stopped will be explained. FIG. 10 is a diagram illustrating a flowchart of the drive control of the fuel blower 106. As illustrated in FIG. 10, after the electric power generation is stopped, the controller 900 first stops the driving of the fuel blower 106 (step S10). This stops the supply of the fuel gas to the hydrodesulfurizer 100.

Next, the controller 900 determines whether a predetermined time period has elapsed from the stop of supplying the fuel gas (step S12). If the predetermined time period has elapsed (step S12: YES), the controller 900 resumes the driving of the fuel blower 106 and supplies the fuel gas to the hydrodesulfurizer 100 (step S14). The amount of one supply is, for example, the volume of the hydrodesulfurizer 100 and the reformer 200. If the amount of one supply is excessive, the hydrodesulfurizer 100 desulfurizes at a normal temperature, which increases the wearing out of the hydrodesulfurization catalysts.

Next, the controller 900 supplies air to the burner 400 (step S16) and terminates the process. By this step, the fuel cell module 1 is prevented from filled with the fuel gas.
(Effect)

As seen from the above, in the fuel cell module 1 according to the eighth embodiment, the first orifice 120 is disposed in the desulfurized fuel gas pipe 102. With this configuration, the oxygen-containing gas is hard to be mixed in the hydrodesulfurizer 100, which inhibits the degradation of the hydrodesulfurization catalysts. The first orifice 120 reduces the pulsation of the fuel gas by the fuel blower 106 by suppressing the stream in the desulfurized fuel gas pipe 102. In addition, in the desulfurized fuel gas pipe 102, the first filter 122 is disposed between the outlet of the hydrodesulfurizer 100 and the first orifice 120. With this configuration, it is possible to inhibit the powder of the hydrodesulfurization catalysts from blocking the first orifice 120.

The fuel gas is supplied to the hydrodesulfurizer 100 after a given time period elapses from the stop of supplying the fuel gas to the hydrodesulfurizer 100, the given time period being a time period in which oxygen diffuses to reach the hydrodesulfurizer 100. With this configuration, it is possible to fill from the hydrodesulfurizer 100 to the reformer 200 with the fuel gas. By repeating this, the oxygen-containing gas is inhibited from entering the hydrodesulfurizer 100 during the stop of the electric power generation, and the degradation of the hydrodesulfurizer 100 can be inhibited.

Ninth Embodiment

A fuel cell module 1 according to a ninth embodiment differs from that in the eighth embodiment in that a water partition plate is placed in the water supply pipe to the reformer. Differences from the eighth embodiment will be explained below.
(Configuration)

FIGS. 11A and 11B are schematic views showing a configuration of a fuel cell module 1 according to the ninth embodiment. FIG. 11A is a lateral cross sectional view of a fuel cell module 1, and FIG. 11B is a front cross sectional view of the fuel cell module 1. The same components as those in the eighth embodiment are denoted by the same reference characters, and the explanation thereof will not be made.

As illustrated in FIGS. 11A and 11B, a water partition plate 1000 is disposed in the water supply pipe 202 so as to be closer to the reformer 200 than the confluence 203 of the desulfurized fuel gas pipe 102 and the water supply pipe 202. In addition, holes are formed in an upper portion of the water partition plate 1000, and no holes are formed in a lower portion thereof.
(Action)

After a given time period elapses from the stop of supplying of the fuel gas, liquid water is supplied from the water supply pipe 202. This prevents water from streaming into the reformer 200, and water is supplied to a horizontal portion of the desulfurized fuel gas pipe 102. With this supply, the desulfurized fuel gas pipe 102 and the first orifice 120 are each blocked by capillary force on the water. The water may be supplied after the supply of the certain amount of air illustrated in FIG. 10.
(Effect)

As seen from the above, in the fuel cell module 1 according to the ninth embodiment, the water partition plate 1000 is disposed in the water supply pipe 202 so as to be closer to the reformer 200 than the confluence 203 of the desulfurized fuel gas pipe 102 and the water supply pipe 202. With this configuration, liquid water is inhibited from streaming to be closer to reformer 200 than the water partition plate 1000, and it is possible to store water in the desulfurized fuel gas pipe 102 efficiently. It is thereby possible to seal the outlet of the hydrodesulfurizer 100 and to prevent the oxidation of the hydrodesulfurization catalysts.

Note that, as long as the reformer 200 does not incline downward in a streaming direction of the water supply pipe 202, the water can be inhibited from streaming to be closer to the reformer 200 without using the water partition plate 1000. The inclination of the reformer 200 involves production variations. Thus, with the water partition plate 1000, the production variations in the inclination of the reformer 200 are easy to be allowed, which can enhance a production yield.

Tenth Embodiment

A fuel cell module according to a tenth embodiment differs from that in the ninth embodiment in that a recycling pipe is provided, the recycling pipe branching off from the hydrogen gas pipe and supplying the hydrogen-containing gas to the hydrodesulfurizer. Differences from the ninth embodiment will be explained below.
(Configuration)

Figure 12:
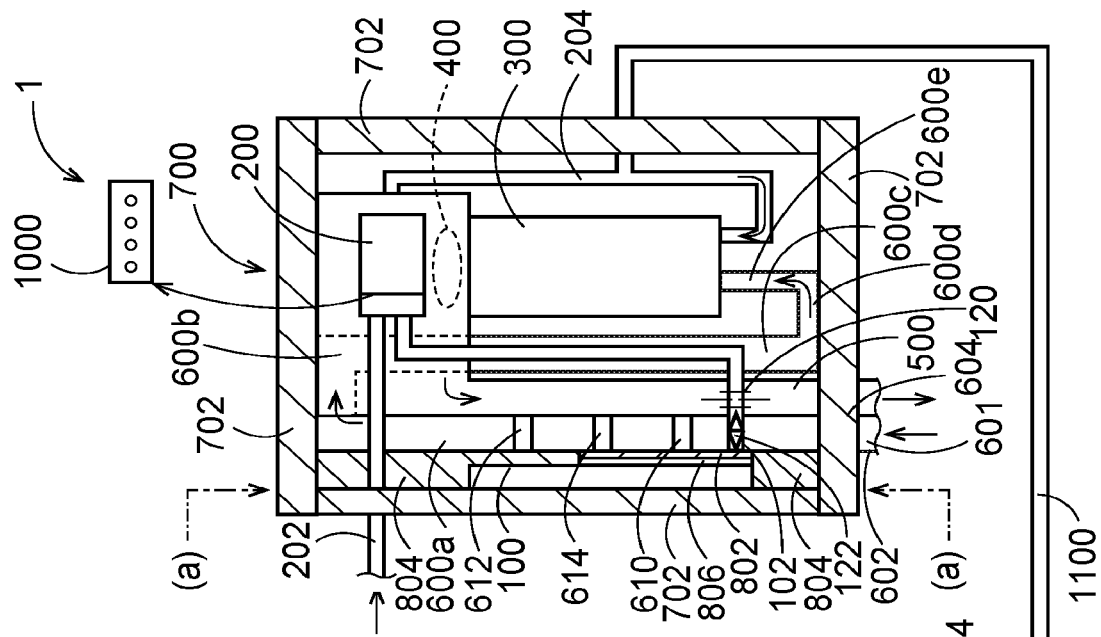
FIG. 12 is a schematic views showing a configuration of a fuel cell module according to the tenth embodiment.
Figure 12:
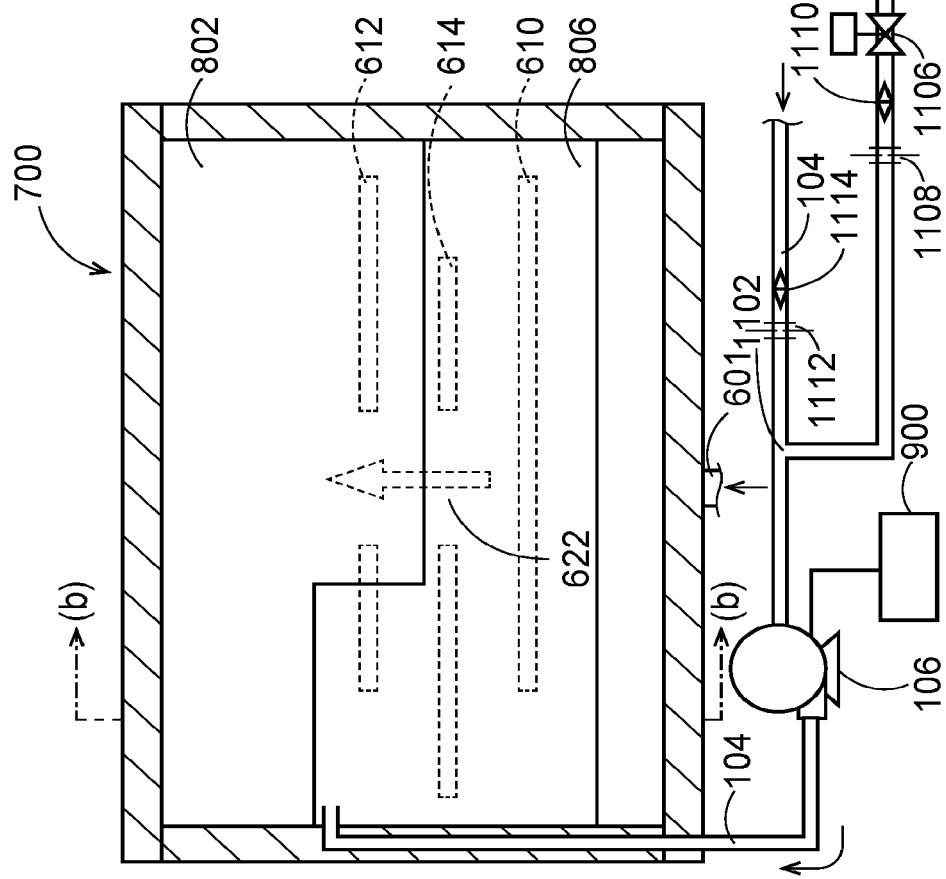

FIG. 12 is a schematic views showing a configuration of a fuel cell module 1 according to the tenth embodiment. The left side figure in FIG. 12 is a lateral cross sectional view of a fuel cell module 1, and The right side figure in FIG. 12 is a front cross sectional view of the fuel cell module 1. The same components as those in the ninth embodiment are denoted by the same reference characters, and the explanation thereof will not be made.

As illustrated in FIG. 12, a recycling pipe 1100 branches off from the hydrogen gas pipe 204 and communicates with the fuel gas pipe 104. The reformer 200 supplies part of the hydrogen-containing gas to the hydrodesulfurizer 100 through the recycling pipe 1100. The recycling pipe 1100 merges with the fuel gas pipe 104 at a confluence 1102.

In the recycling pipe 1100, a drain trap 1104, a shut-off valve 1106, a second orifice 1108, and a second filter 1110 are disposed.

The drain trap 1104 is configured to drain condensed water. The drain trap 1104 is disposed upstream of the second orifice 1108. The shut-off valve 1106 is configured to shut off the recycling pipe 1100. The second orifice 1108 is disposed upstream of the confluence 1102 and configured to inhibit fluctuations in the stream in the recycling pipe 1100. The second filter 1110 is disposed upstream of the second orifice 1108 and is made of a wire net, a blanket insulator, or the like.

In the fuel gas pipe 104, a third orifice 1112 and a third filter 1114 are disposed. The third orifice 1112 is disposed in the fuel gas pipe 104, upstream of the confluence 1102. The third filter 1114 is disposed in the fuel gas pipe 104, upstream of the third orifice 1112.

In the present embodiment, the second orifice 1108 is equivalent to a second throttling device, and the third orifice 1112 equivalent to a third throttling device.

(Action)

The hydrogen-containing gas generated by the reformer 200 is supplied to the hydrodesulfurizer 100 through the recycling pipe 1100. Therefore, without supplying hydrogen from the outside, common city gas and liquefied petroleum gas (LPG) can be used in the electric power generation.

Since the reformer 200 performs reforming using water, the hydrogen-containing gas contains a surplus of steam. Therefore, when the hydrogen-containing gas is cooled, condensed water streams out from the reformer 200. The drain trap 1104 can discharge the condensed water that streams out from the reformer 200. In this case, the hydrogen-containing gas is not discharged.

The shut-off valve 1106 closes immediately after start-up temperature rise where adequate hydrogen is not generated. The second orifice 1108 performs adjustment so that the fuel blower 106 does not suck the hydrogen-containing gas excessively. The second filter 1110 inhibits condensed water that is not completely discharged by the drain trap 1104, from blocking the second orifice 1108.

The third orifice 1112 adjusts the amount of fuel gas sucked by the fuel blower 106. The third filter 1114 inhibits condensed water of vapor contained in city gas or LPG from blocking the third orifice 1112.

(Effect)

As seen from the above, in the fuel cell module 1 according to the tenth embodiment, the recycling pipe 1100 is provided, the recycling pipe 1100 branching off from the hydrogen gas pipe 204 and supplying the hydrogen-containing gas to the hydrodesulfurizer 100. With this configuration, common city gas and liquefied petroleum gas (LPG) can be used in the electric power generation without supplying hydrogen from the outside.

In addition, the second orifice 1108 is disposed in the recycling pipe 1100, and the third orifice 1112 is disposed in the fuel gas pipe 104. With this configuration, pressure drops in the recycling pipe 1100 and the fuel gas pipe 104 can be adjusted individually. Therefore, the ratio between the hydrogen-containing gas and the fuel gas respectively supplied from the recycling pipe 1100 and the fuel gas pipe 104 can be adjusted.

Furthermore, by closing the shut-off valve 1106, the amount of the hydrogen-containing gas supplied to the cell stack 300 can be adjusted. With this configuration, the amount of hydrogen-containing gas supplied to the cell stack 300 can be increased immediately after start up where adequate hydrogen is not generated, or the like, and a start up temperature rise time period for which the hydrogen-containing gas is supplied to the burner 400 can be shortened.

Eleventh Embodiment

A fuel cell module according to an eleventh embodiment differs from that in the first embodiment in that a heater configured to heat the hydrodesulfurizer is provided. Differences from the first embodiment will be explained below.

(Configuration)

FIGS. 13A and 13B are schematic views showing a configuration of a fuel cell module 1 according to the eleventh embodiment. FIG. 13A is a lateral cross sectional view of a fuel cell module 1, and FIG. 13B is a front cross sectional view of the fuel cell module 1. The same components as those in the first embodiment are denoted by the same reference characters, and the explanation thereof will not be made. The configuration of the catalyst chambers 110, 112, and 114 of the hydrodesulfurizer 100 will not be explained for the purpose of the explanation of heaters 1116. For example, the heaters 1116 are disposed so as to face portions upstream of the hydrodesulfurizer 100 and the air-preheating channel portion 600 where the temperature of the hydrodesulfurizer is liable to become low.

As illustrated in FIGS. 13A and 13B, the heaters 1116 are configured to heat the hydrodesulfurizer 100. The heaters 1116 are disposed so as to be in contact with the hydrodesulfurizer 100. In this case, the high-performance wall insulators 800, the low-performance wall insulator 802, and the copper plate 806 need not be disposed.

(Action)

The heaters 1116 are controlled by the controller 900 based on the temperatures of thermocouples placed inside the hydrodesulfurizer 100 (e.g., measured with the thermocouples illustrated in FIG. 1). With this configuration, it is possible to adjust the temperature in the hydrodesulfurizer 100 while measuring the interior temperature of the hydrodesulfurizer 100.

(Effect)

In the fuel cell module 1 according to the eleventh embodiment, the heaters 1116 configured to heat the hydrodesulfurizer 100 are provided. With this configuration, the heaters 1116 can perform heating so as to increase the temperature in the hydrodesulfurizer 100, whereby the temperature of the inside of the hydrodesulfurization catalysts can be adjusted. Therefore, it is possible to bring the temperature in the hydrodesulfurizer 100 closer to a temperature from 200 to 320° C. at which the hydrodesulfurizer 100 can perform the desulfurization optimally. In addition, the electric power generation by the fuel cell module 1 can be performed efficiently even in early stages of operation.

The several embodiments of the present invention are explained above. However, the embodiments are presented as examples and are not intended to limit the scope of the invention. These new embodiments can be implemented in other various forms. Various omissions, substitutions, and changes can be made in a range not departing from the gist of the invention. These embodiments and modifications of the embodiments are included in the scope and the gist of the invention and included in the inventions described in claims and a scope of equivalents of the inventions.

The invention claimed is:

1. A fuel cell module, comprising:
a hydrodesulfurizer configured to desulfurize fuel gas with a hydrodesulfurization catalyst;
a reformer configured to generate hydrogen-containing gas using the desulfurized fuel gas;

a cell stack constituted by stacking a plurality of fuel cells, the cell stack being configured to generate electric power using the hydrogen-containing gas and an oxygen-containing gas;

an exhaust gas channel portion configured to discharge the hydrogen-containing gas that is not consumed by the cell stack, and discharge exhaust gas that is generated by the combustion of the oxygen-containing gas;

an air-preheating channel portion that is disposed so as to be adjacent to the exhaust gas channel portion and that is configured to preheat the oxygen-containing gas through heat exchange with the exhaust gas channel portion, the air-preheating channel portion being disposed between the hydrodesulfurizer and the cell stack;

wherein the air-preheating channel portion includes a first air-preheating channel portion extending from the lower portion to the upper portion of the fuel cell module; and an insulator configured to be arranged so as to be in contact with the hydrodesulfurizer and the first air-preheating channel portion between the hydrodesulfurizer and the first air-preheating channel portion, wherein the hydrodesulfurizer is disposed on one side of the air-reheating channel portion in contact via the insulator with the first air-preheating channel portion, and the exhaust gas channel portion is disposed on the other side of the first air-preheating channel portion in contact via the first air-preheating channel portion and the insulator with the hydrodesulfurizer.

2. The fuel cell module according to claim 1, wherein at least part of the air-preheating channel portion has a planar hollowed shape, covering one side of the cell stack via the exhaust gas channel portion, and has a homogenization channel to homogenize a distribution of heat conducted to the hydrodesulfurizer.

3. The fuel cell module according to claim 2, wherein the homogenization channel is configured such that an amount of the oxygen-containing gas streaming along a central portion of the cell stack is larger than an amount of the oxygen-containing gas streaming along end portions of the cell stack.

4. The fuel cell module according to claim 2, wherein the air-preheating channel portion includes an inlet portion through which the oxygen-containing gas streams in from outside of the fuel cell module, and includes a meandering channel that meanders toward an upper portion.

5. The fuel cell module according to claim 1, further comprising:
a first throttling device disposed in a desulfurized fuel gas pipe that communicates with the hydrodesulfurizer and the reformer; and
a first filter disposed between the first throttling device of the desulfurized fuel gas pipe and the hydrodesulfurizer.

6. The fuel cell module according to claim 5, further comprising:
a fuel blower configured to supply the fuel gas to the hydrodesulfurizer through the desulfurized fuel gas pipe; and
a controller configured to control the fuel blower.

7. The fuel cell module according to claim 1, wherein the fuel gas is supplied to or discharged from the hydrodesulfurizer through a section that is not filled with the hydrodesulfurization catalyst.

8. The fuel cell module according to claim 1, further comprising:
a water supply pipe configured to supply water to the reformer; and
a desulfurized fuel gas pipe configured to communicate between the hydrodesulfurizer and the reformer, the desulfurized fuel gas pipe merging with the water supply pipe in an inner portion of the reformer,
wherein the desulfurized fuel gas pipe has a size small enough to block water by means of capillary force, and water is supplied from the water supply pipe to the desulfurized fuel gas pipe to block the desulfurized fuel.

9. The fuel cell module according to claim 8, further comprising a water partition plate including a hole and disposed upstream of the inner portion of the reformer.

10. The fuel cell module according to claim 1, further comprising:
a fuel gas pipe configured to supply the fuel gas to the hydrodesulfurizer;
a recycling pipe configured to supply part of the hydrogen-containing gas generated by the reformer to the hydrodesulfurizer, the recycling pipe merging with the fuel gas pipe in the reformer;
a drain trap configured to discharge condensed water in the recycling pipe;
a second throttling device disposed in the recycling pipe, downstream of the reformer;
a second filter disposed in the recycling pipe, upstream of the second throttling device;
a third throttling device disposed in the fuel gas pipe, upstream of the reformer; and
a third filter disposed in the fuel gas pipe, upstream of the third throttling device.

11. The fuel cell module according to claim 1, further comprising:
a heater disposed between the air-preheating channel portion and the hydrodesulfurizer, which is adjusted based on at least one or more of thermometers in the hydrodesulfurizer.

* * * * *